US011867836B2

(12) United States Patent
Meissner et al.

(10) Patent No.: US 11,867,836 B2
(45) Date of Patent: *Jan. 9, 2024

(54) SIGNAL TEMPORAL POSITION DETERMINATION

(71) Applicant: Infineon Technologies AG, Neubiberg (DE)

(72) Inventors: Paul Meissner, Feldkirchen bei Graz (AT); Thomas Gigl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,255

(22) Filed: Jul. 20, 2022

(65) Prior Publication Data

US 2023/0012377 A1 Jan. 12, 2023

Related U.S. Application Data

(63) Continuation of application No. 16/364,505, filed on Mar. 26, 2019, now Pat. No. 11,442,145.

(51) Int. Cl.
| | |
|---|---|
| *G01S 7/48* | (2006.01) |
| *G01S 7/4861* | (2020.01) |
| *G01S 7/4865* | (2020.01) |
| *G01S 17/42* | (2006.01) |
| *G01S 17/26* | (2020.01) |

(52) U.S. Cl.
CPC .......... *G01S 7/4808* (2013.01); *G01S 7/4804* (2013.01); *G01S 7/4861* (2013.01); *G01S 7/4865* (2013.01); *G01S 17/26* (2020.01); *G01S 17/42* (2013.01)

(58) Field of Classification Search
CPC .... G01S 7/4808; G01S 7/4804; G01S 7/4861; G01S 7/4865; G01S 17/26; G01S 17/42; G01S 17/10; G01S 7/487; G01S 7/4863
USPC ......................................................... 356/5.01
See application file for complete search history.

(56) References Cited

U.S. PATENT DOCUMENTS

| | | | |
|---|---|---|---|
| 10,884,126 B2* | 1/2021 | Shu | ........................ G01S 7/4863 |
| 11,442,145 B2* | 9/2022 | Meissner | ................ G01S 17/42 |
| 2002/0181564 A1 | 12/2002 | Whight | |
| 2016/0373162 A1 | 12/2016 | Danev et al. | |

* cited by examiner

*Primary Examiner* — Daniel L Murphy
(74) *Attorney, Agent, or Firm* — COOPER LEGAL GROUP, LLC

(57) ABSTRACT

A method of determining a temporal position of a received signal within a sample series is disclosed. The method includes sampling a sensor at a sampling frequency to generate the sample series. A matched filter set of matched filters is applied to the sample series to generate a matched filter correlation set of matched filter correlations, wherein impulse responses of respective matched filters correspond to a template signal at the sampling frequency of the sensor shifted by a sub-interval shift. The matched filter correlations are evaluated to determine a received signal sub-interval shift. The temporal position of the received signal within the sample series is determined based on at least the received signal sub-interval shift.

20 Claims, 15 Drawing Sheets

1 GHZ SAMPLING RATE, PULSE DURATION 5NS, 20dB SNR

500 MHZ SAMPLING RATE, PULSE DURATION 5NS, 14dB SNR

SIGNAL TEMPORAL POSITION DETERMINATION

RELATED APPLICATION

This application claims priority to and is a continuation of U.S. application Ser. No. 16/364,505, filed on Mar. 26, 2019, entitled "SIGNAL TEMPORAL POSITION DETERMINATION", which is incorporated by reference herein in its entirety.

TECHNICAL FIELD

The present disclosure relates to the field of signal processing and particularly to the detection of a signal in a sample series of samples from a sensor.

BACKGROUND

Within the field of computing, many scenarios involve a detection of a signal within a sample series, such as a pulse occurring within a sample series. Many such scenarios involve a collection of samples from a sensor at a selected frequency. The sequence of samples may be evaluated to detect whether a signal occurs within a sample series, such as a pulse that was transmitted by an emitter and that is detectable by the sensor. The sample series may be evaluated to detect the occurrence of the signal (e.g., as a comparison with a background noise level of the sample series) as well as the temporal position within the sample series where the sample is detected, such as the beginning, peak, and/or endpoint of the signal.

As one example, a pulse may be emitted by a transmitter at a transmit time, and the sensor may be sampled at a 500-megahertz sampling frequency to measure the output of the sensor at 2-nanosecond sample intervals. The evaluation of the sample series may yield a detection of the pulse within the sample series, as well as a selected sample representing the peak magnitude of the pulse, where the selected sample may have occurred at a particular sampling time that indicates the arrival time of the sample at the sensor. A comparison of the transmit time, as reported by the transmitter, and the sampling time of the sample at the peak of the signal may enable a determination of the transit time of the signal through a medium. Further comparison of the transit time with an estimated transit speed of the signal through the medium may enable a determination of the distance between the transmitter and the sensor. In some such scenarios, such as LIDAR-based distance estimation, the transmitter and sensor may be positioned closely together, and an electromagnetic pulse transmitted by the transmitter may reflect off of a surface and may be detected by the sensor. Multiplying half of the transit time by the estimated speed of the signal may enable a determination of the distance from the LIDAR transmitter/sensor combination to the reflecting surface.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method is provided for determining a temporal position of a received signal within a sample series. The method includes sampling a sensor at a sampling frequency to generate the sample series. The method further includes applying a matched filter set of matched filters to the sample series to generate a matched filter correlation set of matched filter correlations, wherein impulse responses of respective matched filters correspond to a template signal at the sampling frequency of the sensor shifted by a sub-interval shift. The method further includes evaluating the matched filter correlations to determine a received signal sub-interval shift. The method further includes determining the temporal position of the signal within the sample series based on at least the received signal sub-interval shift.

In an embodiment of the techniques presented herein, an apparatus is provided for determining a temporal position of a received signal within a sample series. The apparatus includes means for sampling a sensor at a sampling frequency to generate the sample series. The apparatus further includes means for applying a matched filter set of matched filters to the sample series to generate a matched filter correlation set of matched filter correlations, wherein impulse responses of respective matched filters correspond to a template signal at the sampling frequency of the sensor shifted by a sub-interval shift. The apparatus further includes means for evaluating the matched filter correlations to determine a received signal sub-interval shift. The apparatus further includes determining the temporal position of the signal within the sample series based on at least the received signal sub-interval shift.

In an embodiment of the techniques presented herein, a sensor is provided for determining a temporal position of a received signal within a sample series. The sensor includes a signal detector to apply a matched filter set of matched filters to a sample series of the sensor at a sampling frequency, wherein respective matched filters correspond to a template signal at the sampling frequency shifted by a sub-interval shift, to identify a received signal sub-interval shift of a received signal within the sample series. The sensor further includes a temporal position determiner to determine a temporal position of the received signal within the sample series based on at least the received signal sub-interval shift of the received signal within the sample series.

In an embodiment of the techniques presented herein, a time-of-flight device is provided that determines a time-of-flight of a signal. The time-of-flight device includes an emitter to emit a transmitted signal. The time-of-flight device further includes a receiver to receive a reflection of the transmitted signal by sampling a sensor at a sampling frequency to generate a sample series comprising a received signal. The time-of-flight device further includes a signal detector to apply a matched filter set of matched filters to the sample series, wherein impulse responses of respective matched filters correspond to a template signal sampled at the sampling frequency and shifted by a sub-interval shift, to identify a received signal sub-interval shift of the received signal within the sample series. The time-of-flight device further includes a time-of-flight determiner that determines a time-of-flight of the transmitted signal based on at least the received signal sub-interval shift of the received signal within the sample series.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
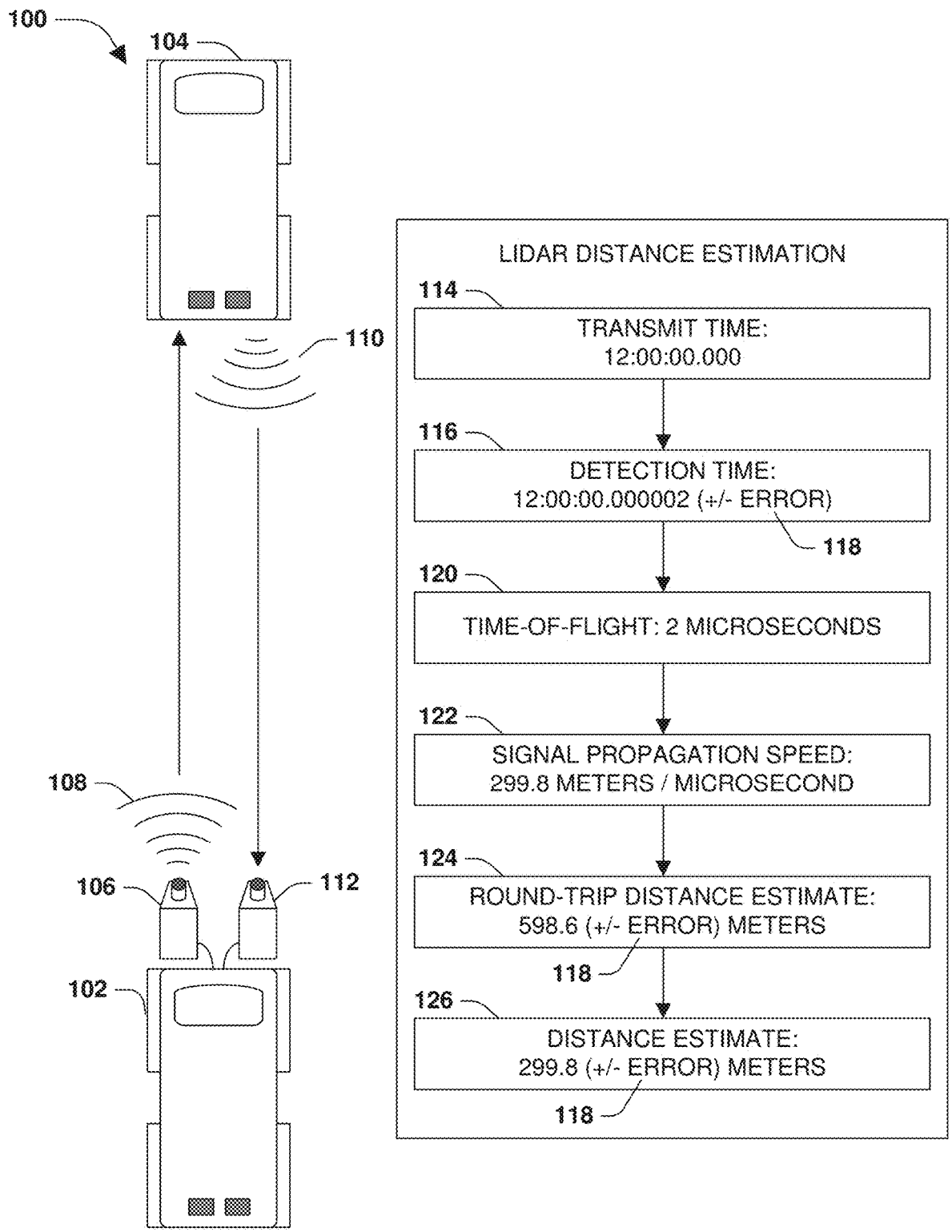
FIG. 1 is an illustration of an example scenario featuring a time-of-flight estimation of a signal.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

Within the field of electronics, many scenarios involve the detection of a signal within a sample series generated by a sensor. The signal may be singular (e.g., a pulse), aperiodic, or periodic; may be generated by a natural source, an individual, or a mechanical or electronic device; may be transmitted through many media, such as air, water, ground, a conductive wire, or a vacuum; and may be detected by many varieties of devices, such as photodiodes, microphones, electromagnetic sensors, pressure sensors, and transducers.

In many scenarios, the monitoring of a sensor may be performed only to detect the occurrence of an instance of the signal. However, in some scenarios, a temporal position of the signal within the sample series may be useful in applications of the detected signal. As an example, the temporal position of the signal may indicate a temporal offset with respect to another event, such as a duration between a start time of the sample series and a time at which the signal was detected. Additionally, in many applications, the precision of the temporal position within the sample series may be significant, as the precision may affect the resolution or error estimation in the occurrence of a corresponding feature as measured by the sensor.

FIG. 1 is an illustration of an example scenario 100 featuring an example of an application in which a sample series is analyzed to detect the occurrence, as well as the temporal position, of a transmitted signal 108 within a sample series in the context of a LIDAR-based range estimation technique. It is to be appreciated that the application illustrated in the example scenario 100 of FIG. 1 is but one of many such applications, involving one of many such types of signals that may be analyzed in accordance with the techniques presented herein.

The example scenario 100 of FIG. 1 involves a first vehicle 102 that is equipped and configured to estimate the distance between the first vehicle 102 and one or more objects, including a second vehicle 104. The estimation of distances may be of significant value in applications such as driver assistance (e.g., braking distance detection and early-warning systems) and autonomous vehicle navigation. The first vehicle 102 may comprise an emitter 106 that emits a transmitted signal 108 through the air in a vicinity of the first vehicle 102. The transmitted signal 108 may be emitted at one or more selected wavelengths (e.g., an infrared beam); with a selected periodicity (e.g., 1,000 instances per second); with a selected waveform (e.g., a near-instantaneous pulse or a Gaussian intensity waveform); and/or with a selected directionality and/or collimation (e.g., a beam directed forward and with a comparatively tight collimation resembling a laser). The reflection of the transmitted signal 108 may be directed back toward the first vehicle 102, and may therefore be detected as a received signal 110 by a sensor 112 that is positioned near the emitter 106. The received signal 110 may for example be a received light pulse reflected back from an object. The sensor 112 may operate at a selected wavelength (e.g., a photodiode that is selectively sensitive to the wavelength emitted by the emitter 106 and/or a sense signal may be sampled at a sampling frequency (e.g., measuring the conductance of the photodiode over a sample interval, such as 50 nanoseconds) to generate a chronological series of samples, where each sample represents a measurement of the sensor (e.g., samples that reflect a measurement of the photodiode over a sample interval of 50 nanoseconds). The sample interval is therefore calculated by taking the inverse of the sampling frequency. The sensor 112 may be one pixel or may be a cluster of binned pixel outputting a combined sensor signal.

A sample series generated by a sensor 112 may be evaluated to detect an occurrence of the transmitted signal 108, such as a waveform in the sample series that resembles a template waveform (e.g., the waveform emitted by the emitter 106). In some embodiments, the waveform to be detected may be a pulse waveform corresponding to a laser pulse waveform emitted by emitter 106. The occurrence of the transmitted signal 108 within the sample series may denote a time of the received signal 110 comprising the reflection of the transmitted signal 108 off of a surface. Moreover, the temporal position of the transmitted signal 108 within the sample series may indicate the time at which the sensor 112 detected the received signal 110. Establishing the detection time and comparing with the time at which the emitter 106 emitted the transmitted signal 108 may enable a determination of the overall time-of-flight of the transmitted signal 108 between the emitter 106 and the reflecting surface of an object, such as the second vehicle 104. For instance, in the example scenario 100 of FIG. 1, the emitter 106 emits the transmitted signal 108 at a transmit time 114, and sampling of the sensor 112 indicates detection of the received signal 110 at a detection time 116. The difference of these times may indicate the time-of-flight 120 of the transmitted signal 108, such as two microseconds. Additionally, multiplying the time-of-flight 120 by the signal propagation speed 122 of the transmitted signal 108 (such as the speed of infrared light through air, i.e., 299.8 meters per microsecond) may reveal the distance traveled by the transmitted signal 108. Because such time-of-flight may reflect the path including the emitter 106, the second vehicle 104, and the sensor 112, the resulting round-trip distance estimation 124 (e.g., 598.6 meters) may be divided by two to arrive at a distance estimate 126 between the first vehicle 102 and the second vehicle 104 (e.g., 299.8 meters). In this manner, a LIDAR transmitter and detector combination may permit the formulation of distance estimates 126 between the first vehicle 102 and nearby objects such as the second vehicle 104. The distance estimate 126 may be used, e.g., to gauge braking distances and warn a driver of the first vehicle 102 of unsafe driving conditions, and/or to adapt the autonomous control of the vehicle, such as adjusting the speed of the first vehicle 102 to maintain a safe braking distance with respect to the second vehicle 104.

As further illustrated in the example scenario 100 of FIG. 1, a significant aspect in the LIDAR-based distance estimation is the precision of the signal detection, which manifests as an error 118 between the actual and the estimated distance. The precision of the signal detection may correspond to the variance in the detection time 116. For example, if the sensor 112 is sampled at a sampling frequency of 500 megahertz, each sample measurement of the sensor 112 is taken over a sample interval of 2 nanoseconds (inverse of 500 megahertz), and the received signal 110 may have actually arrived at the sensor 112 at any time within the 2 nanosecond sample interval. The error 118 of the detection time 116 is therefore identified as up to 2 nanoseconds before or after the detected time. Although comparatively brief, the sample interval of the sample and the resulting error are amplified by the high signal propagation speed 122 of 299.8 meters per microsecond. As a result, the 2 nanosecond difference between a first received signal 110 arriving at the start of a sample interval and a second received signal 110 arriving at the end of a sample interval may result in an error range in the distance estimate 126 of about 60 centimeters.

As illustrated by the example scenario 100 of FIG. 1, the temporal position of the received signal 110 within the sample series—as well as the precision of the established temporal position—may significantly affect the functionality of systems that utilize such information. It may be further appreciated that the precision of the temporal position of the received signal 110 of the transmitted signal 108 is based, at least in part, on the sampling frequency of the sensor 112.

Figure 2:
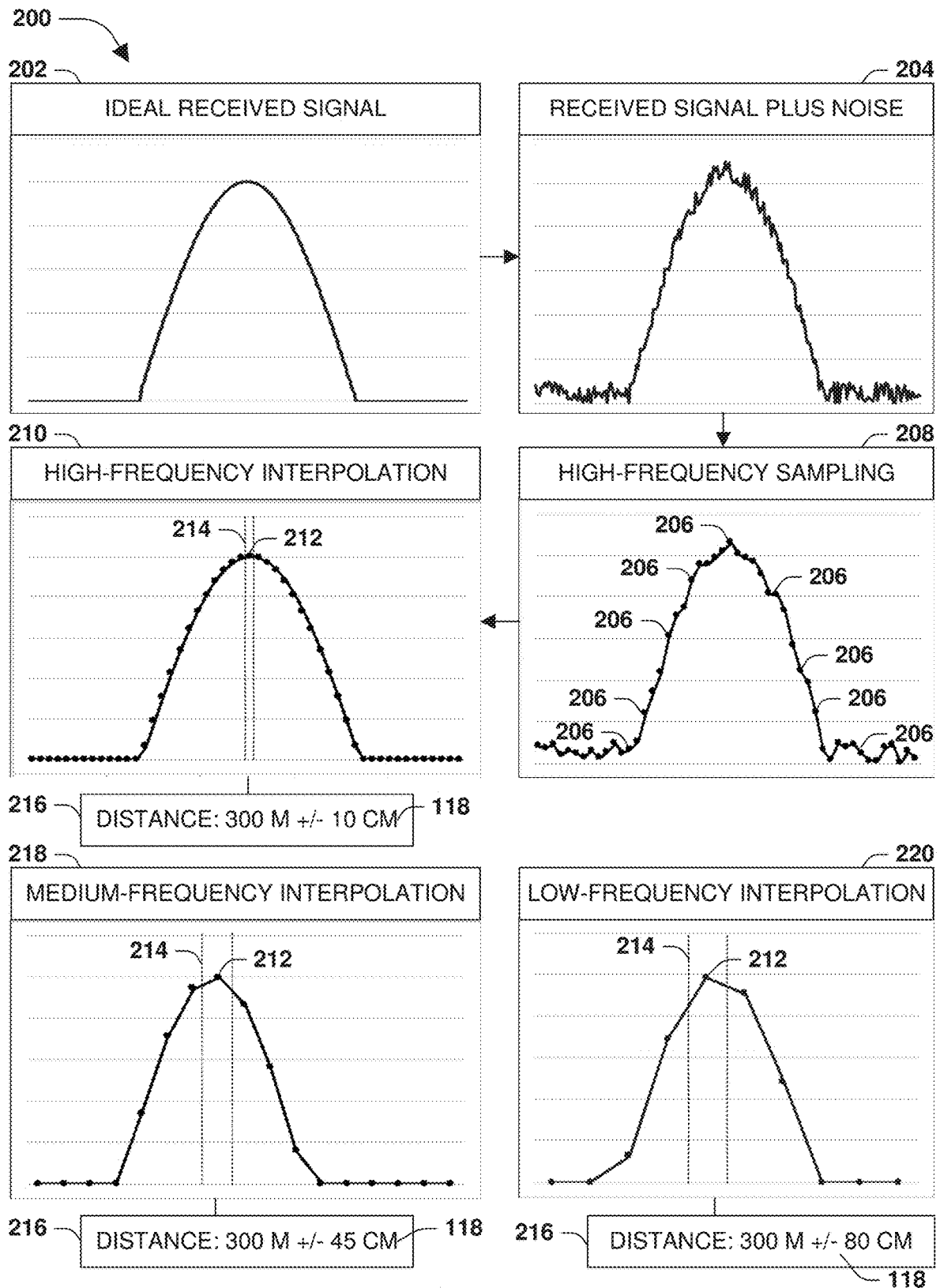
FIG. 2 is an illustration of an example scenario featuring an analysis of a signal at various sampling frequencies.

FIG. 2 is an illustration of an example scenario 200 featuring an analysis of a signal at various sampling frequencies. FIG. 2 depicts an ideal received signal 110 in the absence of noise, but the sensor 112 may detect the received signal plus noise 204. The continuous-time output of the sensor 112 may be sampled (e.g., by an analog-to-digital converter) at a selected sampling frequency to produce a sample series 206 of samples, each comprising a measurement of the sensor 112 over a sample interval. A sampling of the sensor 112 at a high sampling frequency may produce a high-frequency sampling 208, wherein respective samples reflect the output of the sensor 112 over a narrow sample interval. A comparison of the high-frequency sampling 208 with the waveform of the ideal received signal 202 may enable a high-frequency interpolation 210 of the high-frequency sampling 208, including a delineation of the ideal received signal 202 from noise.

As further illustrated in the example scenario 200 of FIG. 2, the analysis of the discrete-time high-frequency sampling 208 may enable a detection of an instance of the received signal 110 within the discrete-time sample series. In addition, analysis of the high-frequency interpolation may enable an identification of the temporal position 212 of the received signal 110 within the discrete-time sample series (e.g., the indices of the discrete-time samples in which the received signal 110 appears and the corresponding sampling times represented thereby). As an example, the temporal position 212 may be identified as a peak sample value in the sample series; as a mean or median center of the received signal 110 (e.g., a center of mass); and/or as a start or end of the received signal 110, as indicated by the first or last sample in the sequence of samples over which the received signal 110 appears in the discrete-time sampling. However, the temporal position 212 of the received signal 110 may be determined with a precision that is at least partially based on the sample interval 214 represented by each sample. If the sensor 112 is instead sampled at a lower sampling frequency, resulting in a smaller number of samples that are respectively collected over a larger sample interval 214, the resulting medium-frequency interpolation 218 may produce a detection of the received signal 110 at approximately the same temporal position 212 but with a larger sample interval 214 that represents a larger potential variance within which the received signal 110 may have arrived at the sensor 112. Further reducing the sampling frequency of the sensor 112 may produce a low-frequency interpolation 220, wherein the received signal 110 is again established at approximately the same temporal position 212 but with an even larger sample interval 214 within which the received signal 110 may have arrived at the sensor 112. The variance in the precision achieved by the interpolations at various sampling frequencies may affect the resolution of the resulting measurements based on the temporal position 212 of the received signal 110 within the sample series. For example, if the temporal position 212 of the signal is used to estimate a distance in a LIDAR-based ranging system, then each interpolation may produce a temporal position determination 216 with the same distance estimate 126, but with a different error that is inversely related to the sampling frequency. That is, the high-frequency interpolation 210 may enable a temporal position determination 216 and a distance estimate 126 with a 10 centimeter range of error; the medium-frequency interpolation 218 may enable a temporal position determination 216 and a distance estimate 126 with a 45 centimeter range of error; and the low-frequency interpolation 220 may enable a temporal position determination 216 and a distance estimate 126 with an 80 centimeter range of error.

In some applications of signal analysis in which the precision of the temporal position 212 of the received signal 110 is significant and is determined to be inadequate, the precision and the resulting resolution of the measurement may be increased by increasing the sampling frequency of the sensor 112. However, some applications may not permit increases in the sampling frequency. As a first example, an analog-to-digital converter that samples the sensor 112 may exhibit a maximum clock rate, and raising the clock rate of the analog-to-digital converter may require additional circuitry, raise the costs, and produce incorrect calculations. As a second example, the number of samples in the sample series 206 may exceed the memory capacity of a device that analyzes the sample series 206 to detect the received signal 110. It may therefore not be possible to detect the full waveform of the received signal 110 within the number of samples stored by the memory of the device. As a third example, in scenarios that depend upon a real-time or near-real-time detection of the received signal 110, the detection of the received signal 110 and the determination of the temporal position 212 within a high-volume sample series may be delayed to the point of inadequacy for the real-time or near-real-time application of such determinations. In some scenarios, increasing the sampling frequency of the sensor 112 may be possible but undesirable. For example, an analog-to-digital converter may sample the sensor 112 at a higher sampling frequency by scaling to a higher clock rate, but such scaling may increase the computational demands of the conversion for each instance of the sample series 206. The increased computational demands may, in turn, consume more power, which may reduce battery life when used in a mobile device with a limited-capacity battery. The increased clock rate and computational demands of the processor may increase the production of heat, which may raise the temperature of the device. Excessive temperature increases may increase data error rates of the device, and may even damage electronic components of the device, such as the processor or memory.

In view of the considerations presented in the example scenario 200 of FIG. 2, it may be desirable to analyze a sample series to establish the temporal position 212 of the transmitted signal 108 arising therein with a higher precision. Moreover, it may be desirable to do so while maintaining a comparatively modest sampling frequency of the sensor 112, rather than raising the sampling frequency to achieve a higher precision. It may be desirable to provide techniques that increase the precision of the determination of the temporal position 212 of the signal 108 within the sample series 206.

B. Presented Techniques

Presented herein are techniques for detecting a received signal 110 in a sample series 206, where the detection involves determining the occurrence of the received signal 110 within the sample series 206 and also the temporal position 212 of the waveform of the received signal 110 within the sample series 206. Moreover, the techniques presented herein may increase the precision of the determination of the temporal position 212 of the received signal 110 within the sample series 206. It may be observed that sampling the sensor 112 at a selected sampling frequency (such as a 500 megahertz sampling frequency, where respective samples represent a detection over a 2 nanosecond sample interval) may produce a first one of a sample series 206 for a first received signal 110 that arrives at the sensor 112 at a particular time, and a second one of the sample series 206 for a second received signal 110 that arrives at the sensor 112 one sample later (e.g., 2 nanoseconds later). In both the first one and the second one of the sample series 206, the peak of the received signal 110 may have occurred during the same sample interval 214 of the sampling process, and the received signal 110 may appear as a peak occurring at the same sample index, and hence the same temporal position 212, within the sample series 206. A determination based on the index of the temporal position 212 of the peak, such as the example scenario 200 of FIG. 2, may indicate only that both received signals 110 within the sample series 206 arrived within the same 2 nanosecond sample interval 214. However, the distribution of the received signal 110 over the adjacent sequence of samples, matching the waveform of the received signal 110, may vary as a reflection of when each received signal 110 arrived at the sensor 112. That is, both the first one and the second one of the sample series 206 may exhibit the received signal 110 with the same temporal position 212 and general shape that matches the waveform of the received signal 110, but the particular shape of the waveform may correspond to a temporal position offset of the received signal 110 that is smaller than the sample interval 214. For example, in the first one of the sample series 206 for the earlier received signal 110, the magnitudes of the samples preceding the peak may be higher than the magnitudes of the corresponding samples in the second one of the sample series 206 for the later-arriving received signal 110; and, conversely, the magnitudes of the samples following the peak in the first one of the sample series 206 may be lower than the magnitudes of the corresponding samples in the second one of the sample series 206 for the later-arriving received signal 110.

A comparison of the shape of the waveform in the sample series 206 with the waveforms of the ideal received signals 202 that peak at the same temporal position 212, but that arrive with different sub-interval shifts relative to the peak, may enable the determination of a temporal position offset of the temporal position 212 that is smaller than the sample interval 214. One technique for performing such comparison is the use of a matched filter set of matched filters that respectively correspond to a sampling, at the sampling frequency of the sensor 112, of a template signal shifted by a sub-interval shift (e.g., a sampling of the template signal that is delayed or advanced by a magnitude that is less than the sample interval of each sample). The template signal may, for example, correspond to a waveform of the light pulse signal transmitted by the emitter 106. Each matched filter of the matched filter set may correspond to a sampling with a different sub-interval shift. A sub-interval shift may be a shift (e.g., delay) of the template signal by less than the sample interval. Alternatively, the respective matched filters may correspond to a subsample series of samples of the oversampled version of the template signal. Factoring the temporal position offset into the temporal position determination 216, based on the comparison of the correspondence of the template signal with how the received signal 110 is likely to appear if arriving at the sensor 112 with different sub-interval shifts, may enable a higher-precision determination of the temporal position 212 of the received signal 110. Moreover, such increased precision may not result from increasing the sampling frequency of the sensor 112. Rather, applying the techniques presented herein to a comparatively low-frequency sampling of the sensor 112 may produce comparable high-precision results that meet, or even in some cases exceed, the precision achievable by high-frequency sampling 208 of the sensor 112.

Figure 3:
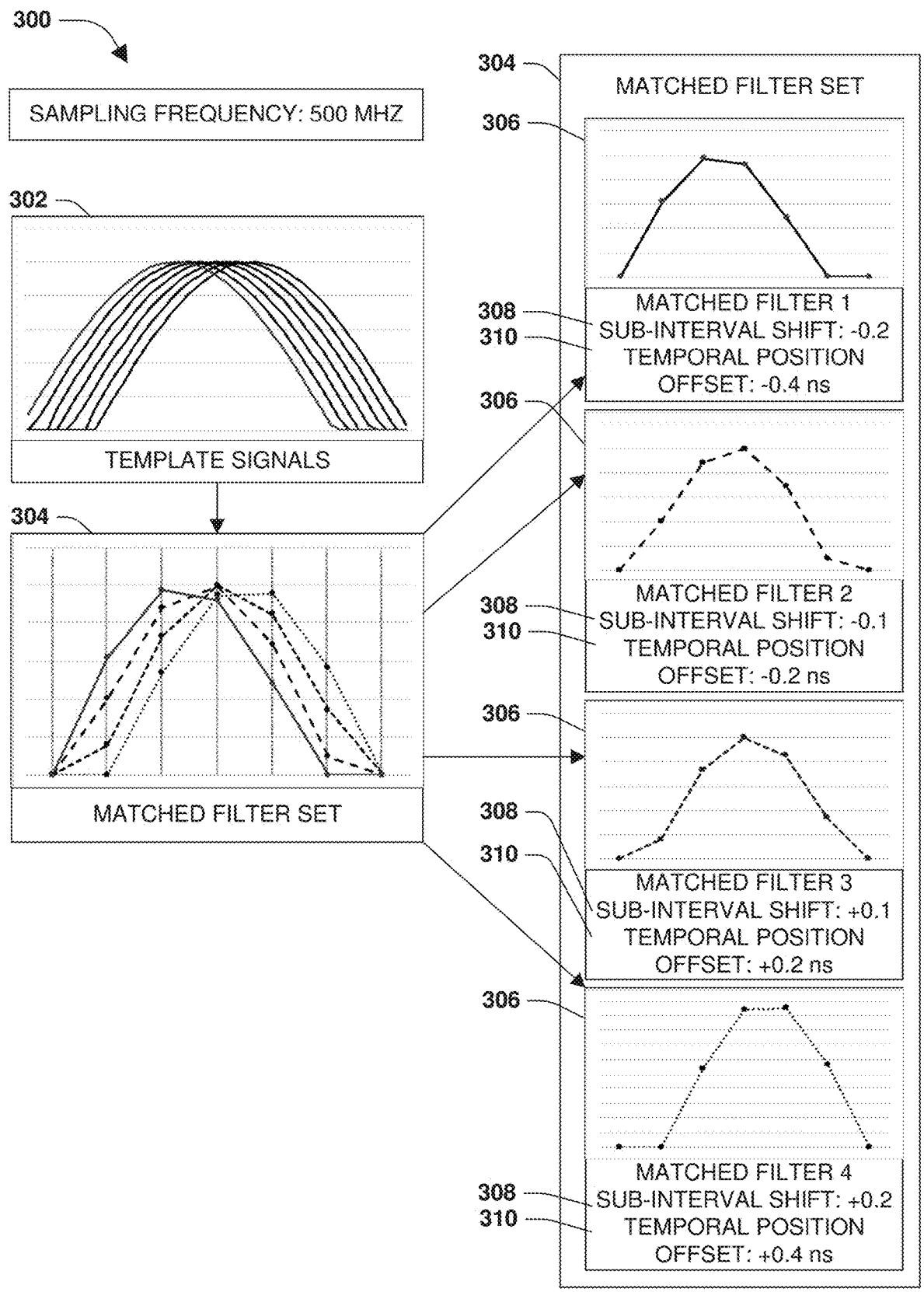
FIG. 3 is an illustration of an example scenario featuring a first example matched filter set of matched filters with impulse responses of respective matched filters that correspond to a signal in a sample series shifted by a sub-interval shift in accordance with the techniques presented herein.
Figure 4:
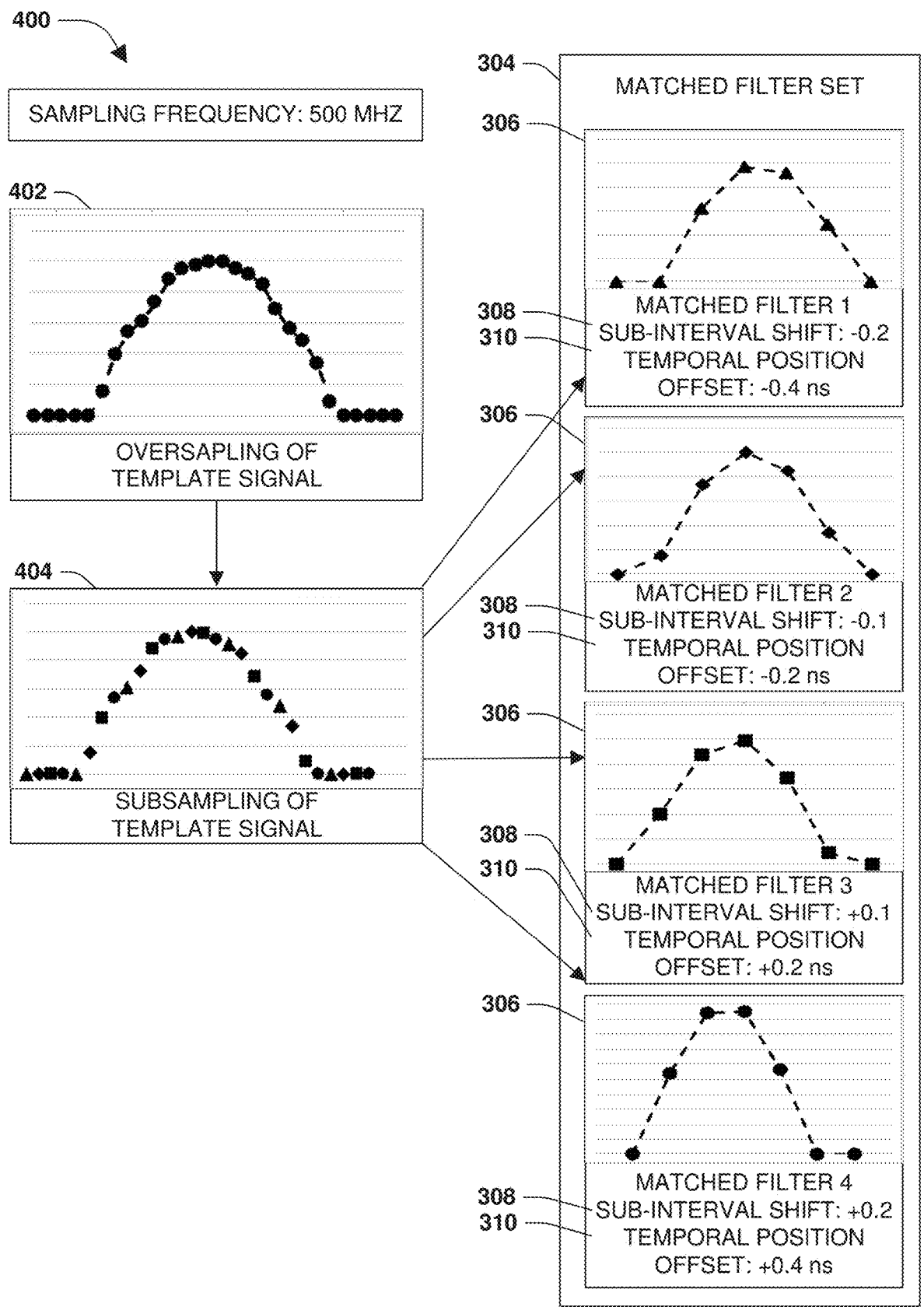
FIG. 4 is an illustration of an example scenario featuring a second example matched filter set of matched filters that respectively correspond to a signal in a sample series shifted by a sub-interval shift in accordance with the techniques presented herein.

FIGS. 3-4 present two techniques for determining the impulse responses of the matched filters of the matched filter set by sampling a template signal 302 at the sampling frequency of the sensor 112 with different sub-interval shifts 308.

FIG. 3 presents an example scenario 300 featuring a first example of impulse responses of a matched filter set 304 generated in accordance with the techniques presented herein. In this example scenario 300, a template signal set of template signals 302 with sub-interval shifts 308 (e.g., phase shifts of the received signal 110) is generated to reflect the arrival of the template signal 302 at the sensor 112 at different times, wherein the differences of the times vary within the sample interval 214 of the sampling frequency. For example, if the sampling frequency of the sensor 112 is 500 megahertz such that the sample interval, and thus the sample intervals 214 of the respective samples, is 2 nanoseconds, then shifted template signals 302 may be considered with sub-interval shifts 308 of −0.2 times the sample interval 214 (e.g., −0.4 nanoseconds); −0.1 times the sample interval 214 (e.g., −0.2 nanoseconds); 0 times the sample interval 214 (e.g., 0 nanoseconds, or unshifted); +0.1 times the sample interval 214 (e.g., +0.2 nanoseconds); and +0.2 times the sample interval 214 (e.g., +0.4 nanoseconds). This signal set may span the range of sub-interval shifts for a single sample interval 214 with a selected step size of 0.2 nanoseconds, because further signal shifts exceed half the width of the sample interval 214 and are therefore detected as at least a full shift of the template signal 302 by one or more samples. The respective template signals 302 are then sampled at the intended sampling frequency of the sensor 112 to generate a matched filter set 304 of matched filters 306, wherein an impulse response of respective matched filters 306 corresponds to the template signal, sampled at the sampling frequency of the sensor 112 and shifted by a sub-interval shift 308 (e.g., an advance or delay of a duration less than one sample interval 214). The sub-interval shifts 308 of the respective matched filters 306 correspond to a temporal position offset of the temporal position 212 of the template signal 302 within the sample series 206. For example, if a sample series 206 exhibits the template signal 302 that corresponds to a first one of the matched filters 306, the received signal 110 within the sample series 206 may be identified as having a temporal position 212 that is shifted by −0.4 sample intervals, which corresponds to an advance of 0.4 nanoseconds, relative to sampling the unshifted template signal 302.

The impulse responses of the respective matched filters 306 of the matched filter set 304 presented in FIG. 3 may be generated for example once by sampling the template signal 302 at a selected sub-interval shift for each matched filter 306. The template signal 302 may, for example, include a received light pulse measured under predetermined condition, for example in a calibration process. In some embodiments, the template signal 302 may comprise a known pulse waveform emitted by the emitter 106. One technique for generating the impulse responses of the respective matched filters 306 in the example scenario 300 of FIG. 3 involves the equation:

$$s_{T,i}[n] = s_T\left(nT_s + \left(\frac{M_{Os} - 1}{2} - (i-1)\right)\frac{T_s}{M_{OS}}\right),$$

$$i = 1, \ldots, M_{OS}, n = 1, \ldots, N_S,$$

wherein:

$N_s$ comprises the count of the matched filters 306 of the matched filter set 304;

n comprises the index of a matched filter 306 of the matched filter set 304;

i comprises the sample index within the matched filter n;

$s_T(\ldots)$ comprises the template signal 302 at the selected time;

$T_S$ comprises the duration of the sample interval of the template signal 302;

$M_{OS}$ comprises the oversampling ratio relative to the sampling frequency of the sensor 112; and $s_{T,i}[n]$ comprises the value of the matched filter n at the sample index i.

FIG. 4 presents an example scenario 400 featuring a second example of a matched filter set 304 generated in accordance with the techniques presented herein. In this example scenario 300, an oversampled version of the template signal 302 is evaluated at a higher sampling frequency than the sampling frequency of the sensor 112. As an example, if the matched filter set 304 comprises four matched filters 306, the oversampling 402 of the template signal 302 may comprise sampling the template signal 302 at four times the sampling frequency of the sensor 112. The oversampling 402 may be divided into sets of subsamples (e.g., a first subsample series comprising samples 0, 4, 8, 12, . . . ; a second subsample series comprising samples 1, 5, 9, 13 . . . ; a third subsample series comprising samples 2, 6, 10, 14 . . . ; and a fourth subsample series comprising samples 3, 7, 11, 15; . . . ). The respective subsamples 404 of the oversampling 402 may be used to generate a matched filter set 304, where the impulse response of the respective matched filters 306 corresponds to a selected subsample series of samples of the subsamples 404. Moreover, each subsample series corresponds to a representation of the received signal 110 arriving at the sensor 112 with the respective sub-interval shift 308 (e.g., the first one of the subsample series may correspond to the sampling, at the sampling frequency of the sensor 112, of the received signal 110 arriving with a −0.4 sample interval advance relative to the un-shifted received signal 110). Accordingly, the impulse responses of the respective matched filters 306 of the matched filter set 304 are correlated with the template signal 302 within the sample series 206 that is shifted from the temporal position 212 by the temporal position offset 310. For example, if the sample series 206 exhibits the received signal 110 that corresponds to the first one of the matched filters 306, the received signal 110 may be identified as having the temporal position 212 shifted by −0.4 sample intervals, which corresponds to an advance of 0.4 nanoseconds, relative to sampling the un-shifted received signal 110.

The respective response functions of the matched filters 306 of the matched filter set 304 presented in FIG. 4 may be generated once (e.g., in a matched filter set-up routine) or multiple times using a subsample series of subsamples of an oversampling 402 of the template signal 302. One technique for generating the respective matched filters 306 in the example scenario 400 of FIG. 4 involves the equation:

$$s_{T,i}[n] = s_T\left(n\frac{T_s}{M_{OS}}\right), n = i, M_{OS} + i, \ldots, (N_s - 1)M_{OS} + i$$

wherein:
$N_s$ comprises the count of the matched filters 306 of the matched filter set 304;
n comprises the index of the matched filter 306 of the matched filter set 304;
i comprises the sample index within the matched filter n;
$s_T(\ldots)$ comprises the sampling of the template signal 302 at the selected time corresponding to the sub-interval shift 308;
$T_S$ comprises the sample interval of the template signal 302;
$M_{OS}$ comprises the oversampling ratio relative to the sampling frequency of the sensor 112; and
$s_{T,i}[n]$ comprises the value of the matched filter n at the sample index i.

Figure 5:
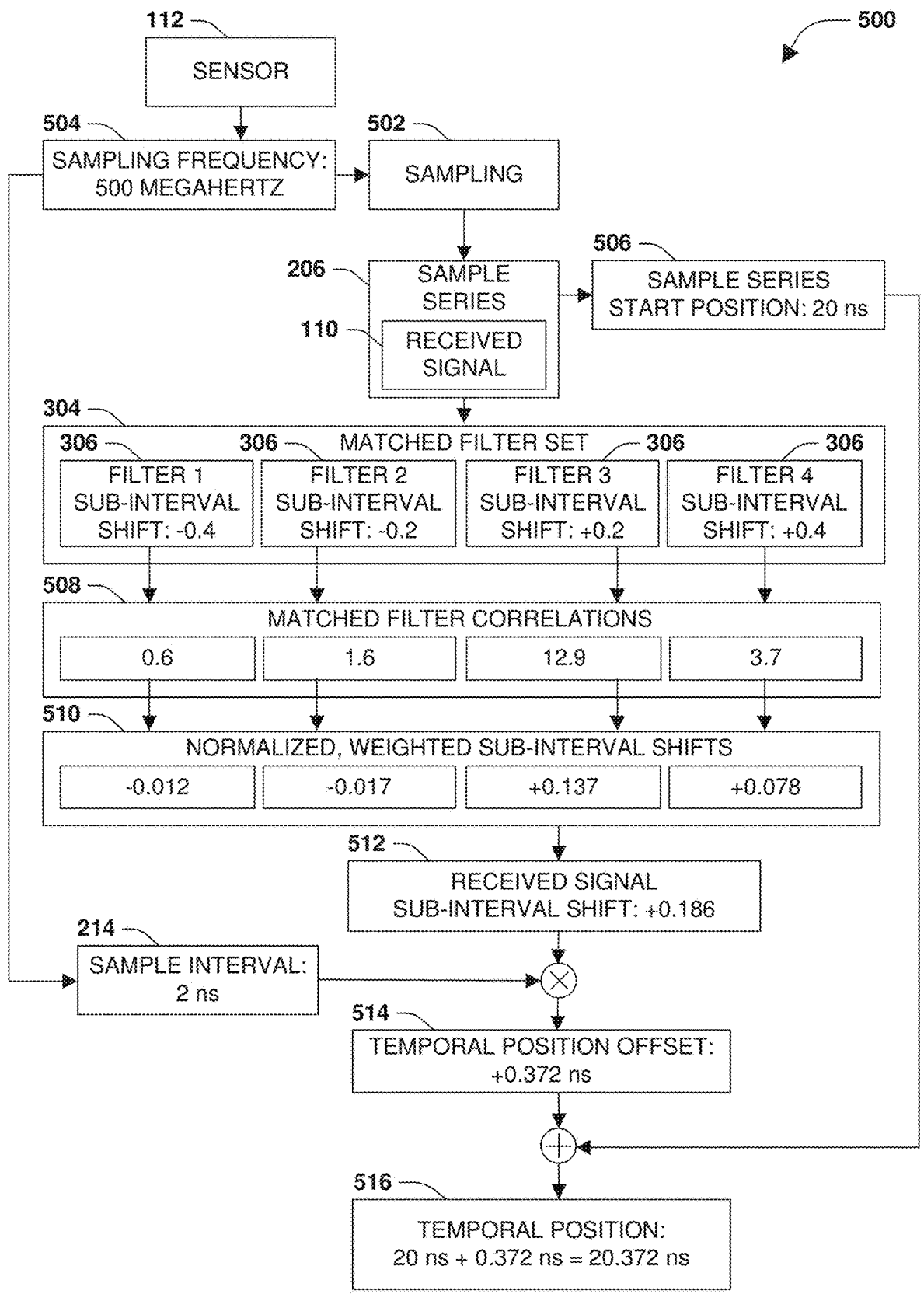
FIG. 5 is an illustration of an example scenario featuring a determination of a temporal position of a signal within a sample series using a matched filter set of matched filters in accordance with the techniques presented herein.

FIG. 5 is an illustration of an example scenario presenting the use of the matched filter set 304, such as the first example matched filter set 304 in the example scenario 300 of FIG. 3 or the second example matched filter set 304 in the example scenario 400 of FIG. 4, to detect the occurrence and temporal position of the received signal 110 within the sample series 206. In this example scenario 500, the sensor 112 is subjected to a sampling 502 at a sampling frequency 504, such as 500 megahertz, to generate a discrete-time sample series 206 in which the received signal 110 may be present. The sensor 112 may, for example, comprise a pixel or any other sensor element generating the received signal 110 to measure. A sample series start position 506 may also be identified (e.g., as the starting time of the sample series as 20 nanoseconds). The reference position may, for example, be determined by the sample corresponding in time to the emission time of the LIDAR pulse beam. Each of the matched filters of the matched filter set 304 receives the sample series 206 (either the sample series signal directly or a replica of the sample series). To allow each of the matched filters to receive the sample series 206, the samples of the sample series may be replicated multiple times and the replicated samples are provided to the matched filter set. The matched filter set 304 may be applied to the sample series 206 to determine whether the received signal 110 appears in the sample series 206 at respective temporal positions 212 relative to the sample series start position 506. The matched filters of the matched filter set 304 may be arranged for parallel processing of the sample series. Thus, in this example scenario 500, the sample series (e.g., by replicating the original sample series 206 to produce identical copies) is provided in parallel to each matched filter 306 of the matched filter set 304, and the matched filters 306 process the sample series 206 in parallel. Each matched filter 306 outputs a matched filter correlation 508 indicating the correlation of the matched filter 306 with the sample series 206 based on the impulse response of the respective matched filter 306. For example, the matched filter may determine a series of correlation values over time when the samples of the sample series 206 are input to the matched filter 306 over time. For each of the matched filters 306, the correlation value of this series of correlation values is determined as the matched filter correlation 508 of the sample series together with the sample number to which the maximum correlation value corresponds. A temporal position 516 of the received signal 110 may be identified based on the processing of the matched filter correlation set of matched filter correlations 508 generated by the matched filter set 304 of matched filters 306. In the example scenario 500 of FIG. 5, the temporal position 516 is determined by multiplying the sub-interval shifts 308 of the respective matched filters 306 by the matched filter correlation 508 and normalizing by the sum of the matched filter correlations 508 to produce, for each matched filter 306, a normalized, weighted sub-interval shift 510. The sum of the normalized, weighted sub-interval shifts 510 produces a received signal sub-interval shift 512 for the received signal 110 of 0.186, which reflects the sub-interval shift 308 of the received signal 110 within the sample series 206 according to the sub-interval shifts 308 of the respective matched filters 306 and the matched filter correlations 508 of the respective matched filters 306 with the received signal 110 within the sample series 206. The received signal sub-interval shift 512 of 0.186 is multiplied by the sample interval 214 of 2 nanoseconds to determine the temporal position offset 514 of 0.372 nanoseconds, which is added to the sample series start position 506 to produce a determination of the temporal position 516 as, for example, 20.372 nanoseconds. In some other embodiments, the position may be determined based on the time which relates to the index of the maximum correlation value of the matched filter having the maximum correlation value over the sample series compared to the other maximum correlation values of the other matched filters over the sample series.

C. Technical Effects

Some embodiments of the evaluation of the sample series 206 of samples of the sensor 112 to determine the temporal position 212 of the received signal 110 in accordance with the techniques presented herein may enable a variety of technical features with respect to other embodiments that do not use the techniques presented herein.

A first example of a technical effect that may be exhibited by an embodiment of the techniques presented herein involves a high-precision determination of the received signal 110 by the sensor 112 that is not capable of scaling up to a higher sampling frequency 504. As a first such example, the sensor 112 may be configured to operate at a fixed sampling frequency 504 that is not adjustable. As a second such example, the sensor 112 may be driven by an analog-to-digital converter (ADC) with a maximum clock rate, where the precision desired from the sensor 112 may typically involve increasing the sampling frequency 504 beyond the maximum clock rate of the ADC. As a third such example, the sample series 206 to be evaluated may be stored in a fixed-length memory buffer, and increasing the sampling frequency 504 of the sample series 206 may increase the volume of samples that represent a single instance of the received signal 110 beyond the capacity of the memory buffer. As a fourth such example, the signal-to-noise level of the sensor 112 may be acceptable when the sensor 112 is sampled with a low sampling frequency 504, but increasing the sampling frequency 504 and shortening the sample interval 214 may reduce the signal-to-noise ratio, thereby reducing the correlation confidence of the detection of the received signal 110 below a threshold, or in some cases causing the continuous-time received signal 110 to become undetectable against the noise present in each sample. As a fifth such example, the evaluation of a greater volume of data may delay the detection of the received signal 110 within the sample series 206. In scenarios where such detection is performed in real-time or near-real-time, the delayed detection may exceed an acceptable processing delay threshold. In these scenarios, in lieu of increasing the sampling frequency 504 of the sensor 112, increased precision may be achieved at a lower or native sampling frequency 504 of the sensor 112 by utilizing the techniques presented herein.

A second example of a technical effect that may be exhibited by an embodiment of the techniques presented herein involves a high-precision determination of the received signal 110 by the sensor 112 that is capable of scaling up to a higher sampling frequency 504, but where the higher sampling frequency 504 presents some potential disadvantages. As a first such example, increasing the sampling frequency 504 may produce a greater volume of samples. The increased data volume may entail a higher-performance bus between the sensor 112 and memory. As a second such example, the increased volume of samples may involve expanding the memory capacity of the device that is used for the analysis, which may increase the material cost of the device, expand the size of the device, and/or divert memory from other capabilities of the device. Alternatively, even if the memory capacity of a device is capable of storing the entire sample series 206, the evaluation of each sample series 206 may consume more power and computational resources. As a third such example, the consumption of additional power may depend upon a higher-performance processor, which may increase the material cost of the device and/or the size of the device. As a fourth such example, the consumption of additional power may reduce the battery life of a mobile device featuring a limited-capacity battery. As a fifth such example, the consumption of additional power may increase the production of heat, and therefore the temperature of the device. In some scenarios, the additional heat may be dissipated by passive or active device cooling, but the inclusion of such components may increase the material cost of the device and/or the size of the device. In some scenarios, additional cooling components may not be compatible with the architecture of the device. As a sixth such example, the increased temperature may increase the operating temperature and thermal wear on various components of the device, which may increase an error rate or corruption of collected data or the noise level of the sensor 112. The increased temperature may also cause components to be damaged or even destroyed.

A third example of a technical effect that may be exhibited by an embodiment of the techniques presented herein involves an increase in the precision of the detected temporal position 212 of the received signal 110 within the sample series 206. As demonstrated in the example data sets of FIGS. 13-14, simulation of the currently presented techniques at a comparatively modest sampling frequency 504 produced not only a significant increase in precision as compared with other techniques applied at the same sampling frequency 504, but also a higher precision than achieved by evaluating sample series 206 of the sensor 112 collected at a higher sampling frequency 504. In scenarios where the temporal position 212 of the received signal 110 is to be achieved with very high precision and confidence, the use of the techniques presented herein may provide one aspect that increases the resulting precision of the temporal position determination 216. Moreover, some scenarios may utilize both the techniques presented herein and also a higher sampling frequency 504 of the sensor 112 to achieve a combination of increases in the temporal position determination 216. These and other technical effects in the field of signal detection may be exhibited by embodiments of the techniques presented herein.

D. Embodiments

Figure 6:
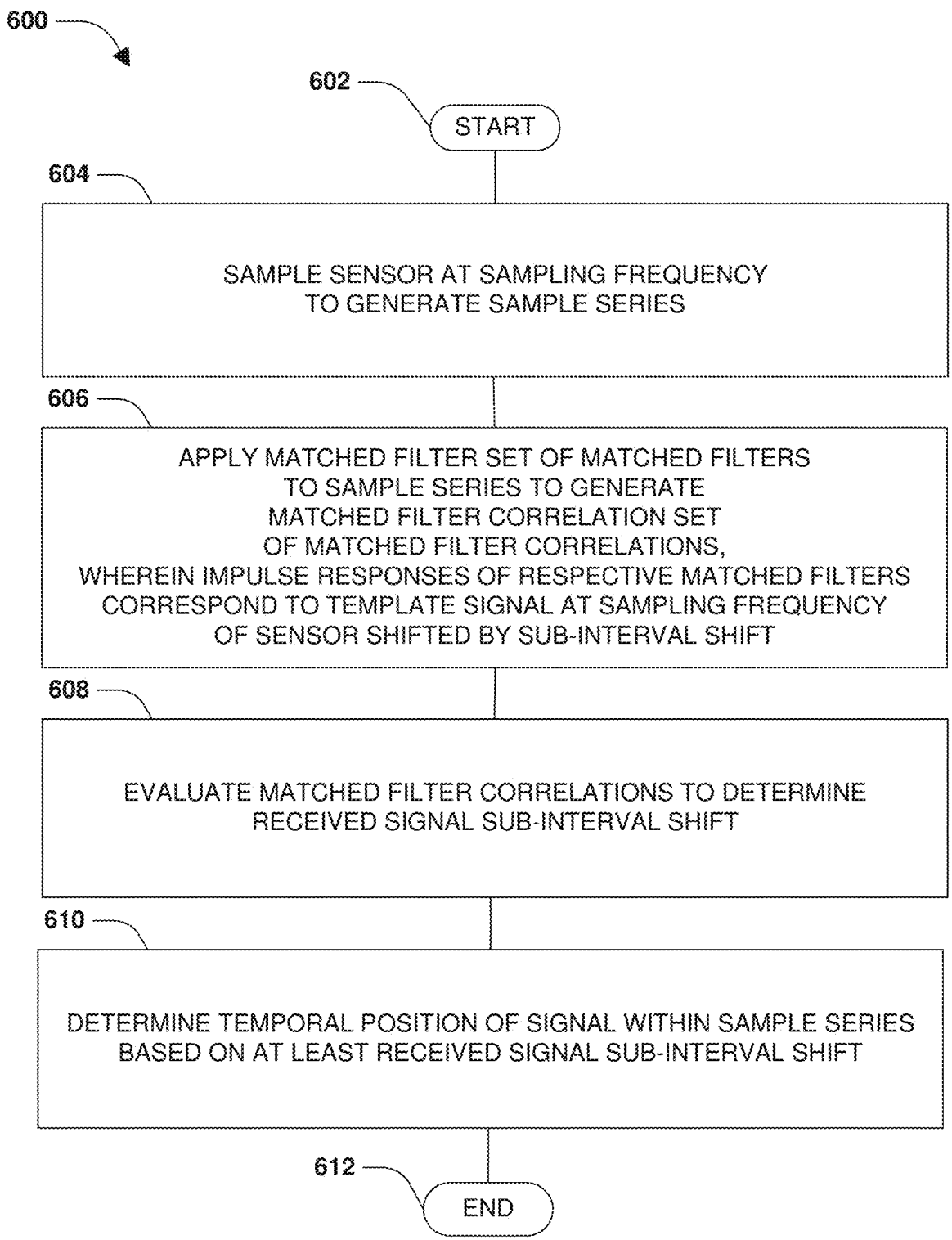
FIG. 6 is an illustration of an example method of determining a temporal position of a signal within a sample series in accordance with the techniques presented herein.

FIG. 6 is an illustration of a first example embodiment of the techniques presented herein, illustrated as an example method 600 of determining the temporal position 212 of the received signal 110 within the sample series 206. The example method 600 may involve a device, and may be implemented, e.g., as a set of instructions stored in a memory of the device, such as firmware, system memory, a hard disk drive, a solid-state storage component, or a magnetic or optical medium, wherein the execution of the instructions by a processor of the device causes the device to operate in accordance with the techniques presented herein.

The example method 600 begins at 602 and includes sampling 604 a sensor 112 at a sampling frequency 504 to generate the sample series 206. The sampling may, for example, include sampling in time of a time-varying output signal of a photodiode. The example method 600 also includes applying 606 a matched filter set 304 of matched filters 306 to the sample series 206 to generate a matched filter correlation set of matched filter correlations 508, wherein impulse responses of the respective matched filters 306 correspond to the template signal 302 at the sampling frequency 504 of the sensor 112 shifted by a sub-interval shift 308. The example method 600 also includes evaluating 608 the matched filter correlations 508 to determine a received signal sub-interval shift 512. For example, the evaluating may involve multiplying the respective matched filter correlations 508 of each matched filter 306 by the sub-interval shift 308 of the matched filter 306; summing the products; and normalizing the sum by a second sum of the matched filter correlations 508. The example method 600 also includes determining 610 the temporal position 212 of the received signal 110 within the sample series 206 based at least on the received signal sub-interval shift 512. For example, the determining may include multiplying the received signal sub-interval shift 512 by the sample interval 214 to determine temporal position offset 514 of the received signal 110 and then adjusting the temporal position 516 of the received signal 110 within the sample series 206 by the temporal position offset 514. Having achieved the determination of the temporal position 212 of the received signal 110 within the sample series 206 in accordance with the techniques presented herein, the example method 600 so ends at 612.

Figure 7:
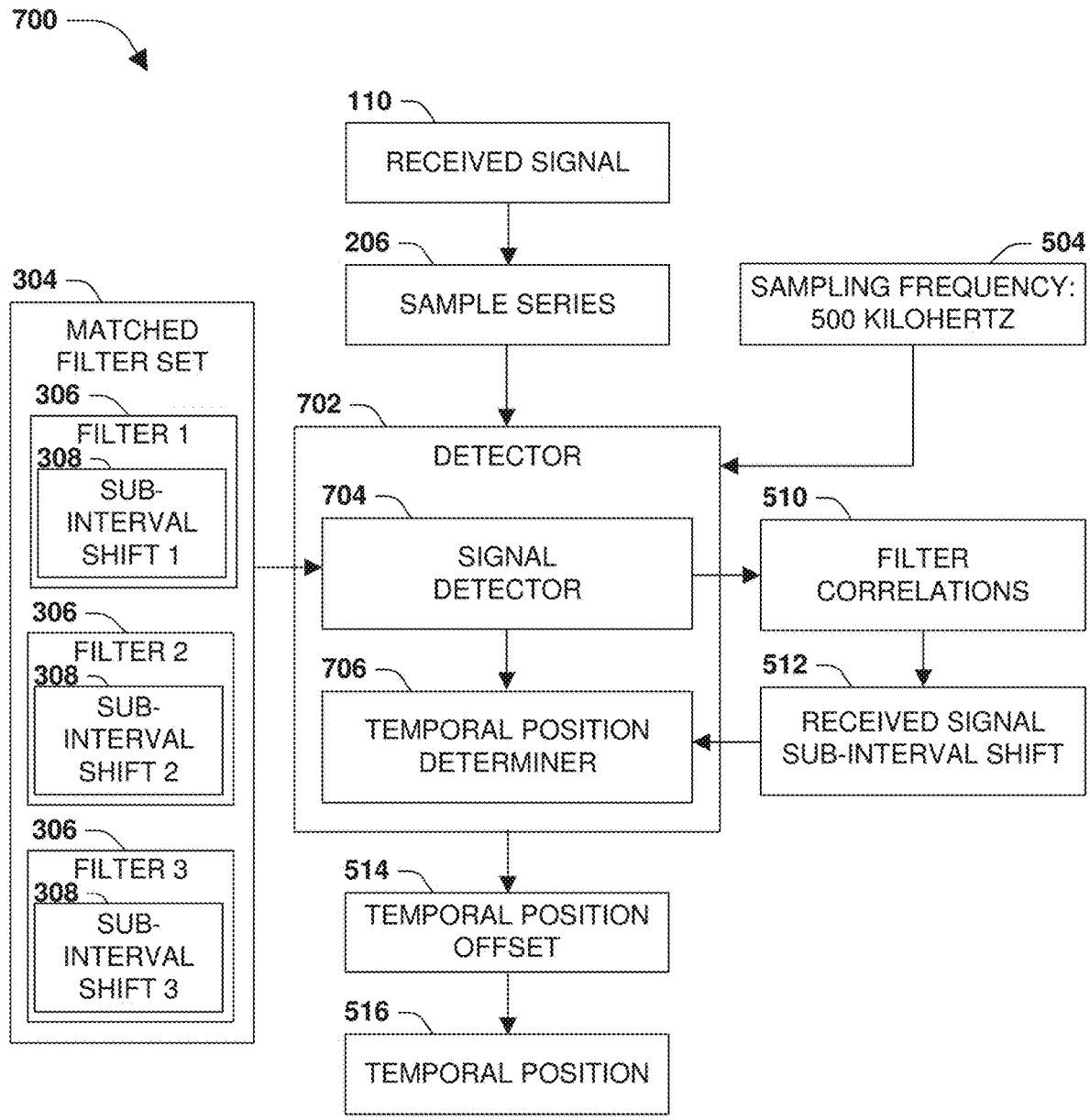
FIG. 7 is a component block diagram illustrating an example sensor that determines a temporal position of a signal within a sample series in accordance with the techniques presented herein.

FIG. 7 is an illustration of an example scenario 700 featuring a second example embodiment of the techniques presented herein, wherein the example embodiment comprises an example detector 702 that is configured to detect the received signal 110 within the sample series 206 generated by the example detector 702 at the sampling frequency 504. The example detector 702 comprises a matched filter set 304 of matched filters 306, wherein the respective matched filters 306 correspond to the template signal 302 at the sampling frequency 504 shifted by the sub-interval shift 308. The example detector 702 may comprise a LIDAR distance ranging system. Some components of the example detector 702 may be implemented, e.g., as instructions stored in a volatile or nonvolatile memory of the example detector 702 and executed by a processor, or as discrete components, such as circuits, that provide a logical analysis of at least a portion of the techniques presented herein.

The example detector 702 includes a signal detector to apply the matched filter set 304 of matched filters 306 to a sample series 206 of the sensor 112 at the sampling frequency 504 to generate a matched filter correlation set of matched filter correlations 508, and to evaluate the matched filter correlations 508 to determine a received signal sub-interval shift 512. The example detector 702 also includes a temporal position determiner 706 to determine a temporal position 212 of the received signal 110 within the sample series 206, based at least in part on the received signal sub-interval shift 512. As an example, the matched filter correlations 508 and the sub-interval shifts 308 of the respective matched filters 306 may be multiplied, and the sum may be normalized by dividing by the sum of the matched filter correlations 508, thereby producing a sum that represents the received signal sub-interval shift 512. The received signal sub-interval shift 512 may be multiplied with the sample interval 214 to produce the temporal position offset 514. The temporal position offset 514 may be added to the temporal position 212 in the sample series 206 at which the received signal 110 has been detected to produce the temporal position 516 of the received signal 110. In this manner, the interoperation of the components enables the example detector 702 to detect the temporal position 516 of the received signal 110 within the sample series 206, in accordance with the techniques presented herein.

Figure 8:
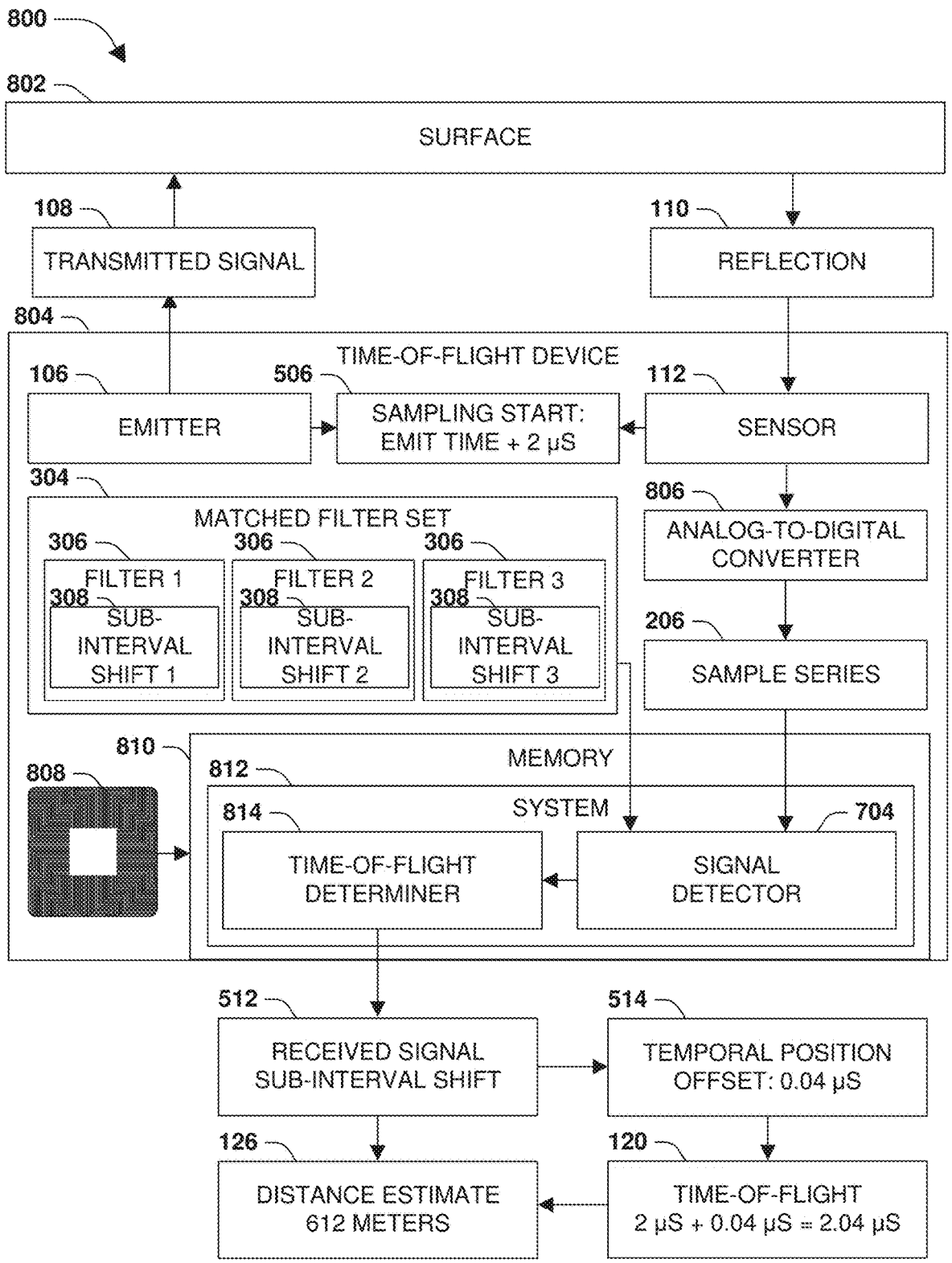
FIG. 8 is a component block diagram illustrating an example time-of-flight device that determines a time-of-flight of a signal in accordance with the techniques presented herein.

FIG. 8 is an illustration of an example scenario 800 featuring a third example embodiment of the techniques presented herein, comprising an example time-of-flight LIDAR device 804 that achieves the time-of-flight determination of the transmitted signal 108 between the time-of-flight LIDAR device 804 and the surface 802. The example scenario 800 also features a fourth example embodiment of the techniques presented herein, comprising an example time-of-flight system 812 that utilizes the resources of the time-of-flight LIDAR device 804 to achieve a time-of-flight determination of the transmitted signal 108. In this example scenario 800, the components of the example system 812 are stored as a collection of instructions in a memory 810 of the example time-of-flight LIDAR device 804, wherein execution of the instructions causes the implementation of respective components of the example system 812 that interoperate to perform the evaluation of the sample series 206 in accordance with the techniques presented herein.

The example time-of-flight LIDAR device 804 includes the emitter 106 that emits the transmitted signal 108. The example time-of-flight LIDAR device 804 also includes the sensor 112 that receives the reflected signal 110. The example time-of-flight LIDAR device 804 further comprises an analog-to-digital converter 806 that samples the sensor 112 at the sampling frequency 504 to generate the sample series 206. The example time-of-flight LIDAR device 804 also includes, as a component of the example system 812, the signal detector 704 that applies the matched filter set 304 of matched filters 306 to the sample series 206, wherein respective matched filters 306 correspond to the template signal 302 at the sampling frequency 504 shifted by the sub-interval shift 308. The example time-of-flight LIDAR device 804 also includes, as a component of the example system 812, a time-of-flight determiner 814 that evaluates the output of the signal detector 704 to determine the received signal sub-interval shift 512 of the received signal 110 within the sample series 206, and that determines the time-of-flight 120 of the received signal 110 within the sample series 206 based on at least the received signal and the sub-interval shift 512 of the received signal 110 within the sample series 206. In this manner, the example time-of-flight LIDAR device 804 and the example system 812 achieve a detection of the received signal 110 within the sample series 206 using the techniques presented herein, which may result in the determination of the time-of-flight 120 of the received signal 110 within the sample series 206 with a greater precision than may otherwise be achieved at the sampling frequency 504 of the sensor 112.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 9:
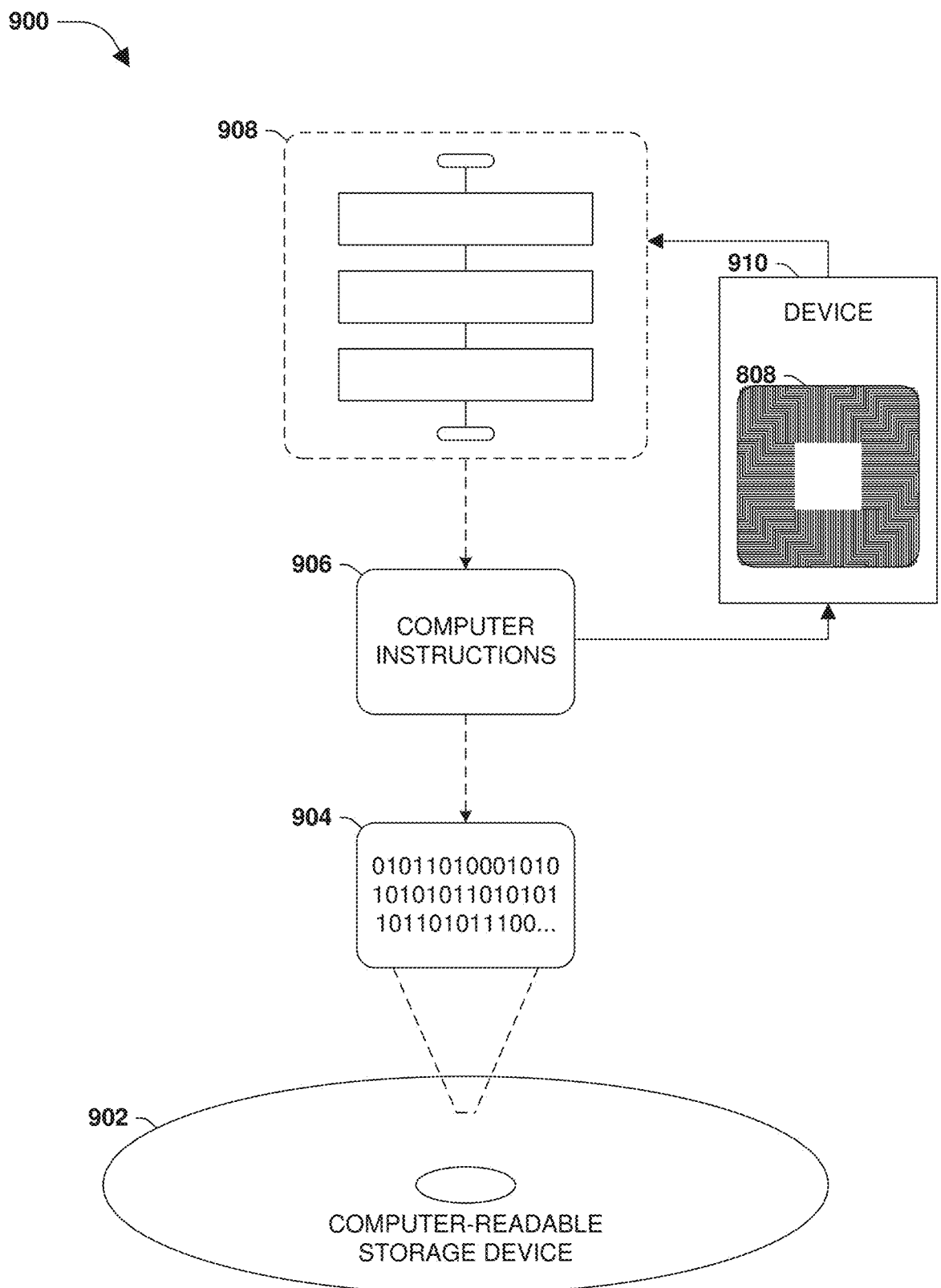
FIG. 9 is an illustration of an example computer-readable storage device storing instructions that, when executed by a processor of a device, cause the device to determine a temporal position of a signal within a sample series in accordance with the techniques presented herein.

An example computer-readable medium that may be devised in these ways is illustrated in FIG. 9, wherein the implementation 900 comprises a computer-readable memory device 902 (e.g., a CD-R, DVD-R, or a platter of a hard disk drive), on which is encoded computer-readable data 904. This computer-readable data 904 in turn comprises a set of computer instructions 906 that, when executed on a processor 808 of a device 910, provide an embodiment that causes the device 910 to operate according to the techniques presented forth herein. As a first such example, the processor-executable instructions 906 may encode a sampling of a sample series 206 to detect a received signal 110 in a sample series 206, such as the example method 600 of FIG. 6. As a second example, the processor-executable instructions 906 may cause the device 910 to operate as a sensor that detects a received signal 110 in a sample series 206, such as the example detector 702 in the example scenario 700 of FIG. 7. As a third example, the processor-executable instructions 906 may cause the device 910 to operate as an example time-of-flight determiner, such as the example time-of-flight LIDAR device 804 in the example scenario 800 of FIG. 8. As a fourth example, the processor-executable instructions 906 may encode a system that detects a received signal 110 having the shape of the template signal 302 in a sample series 206, such as the example system 812 in the example scenario 800 of FIG. 8. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

E1. Scenarios

A first aspect that may vary among scenarios in which the techniques may be utilized relates to the devices with which such techniques may be utilized.

As a first variation of this first aspect, the techniques presented herein may be utilized with a variety of device types, such as workstations, laptops, consoles, tablets, phones, portable media and/or game players, embedded systems, appliances, vehicles, and wearable devices. The device may comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication).

As a second variation of this first aspect, the techniques presented herein may be utilized with a variety of sensors 112 to detect the received signal 110 within the sample series 206. For example, a photodiode such as a PAD (photon avalanche diode) or SPAD (single photon avalanche diode) may generate the transmitted signal 108 based on light of various wavelengths; a microphone may exhibit a variable conductance based on pressure caused by sound waves; and a pressure sensor may exhibit a variable conductance based on physical pressure exerted upon the sensor. Such scenarios may involve transmitted signals 108 that originate naturally and/or organically, or by an unrelated mechanical or electronic device, such as a manmade signal or a natural phenomenon, and the detection of the received signal 110 within the sample series 206 may be achieved by the sensor 112. Alternatively, some scenarios involve the transmission of the transmitted signal 108 by the emitter 106 operating in tandem with the sensor 112, such as in LIDAR-based range estimation. As a third such example, the transmitted signal 108 and the received signal 110 may be singular, repeating in an aperiodic manner, or repeating in a periodic manner. For transmitted signals 108 and received signals 110 that occur repeatedly, the detection may involve correlating respective instances of the received signals 110, such as time differences between received signals 110. In some embodiments, multiple transmitters may be utilized (e.g., MIMO beamforming applications in which the transmitted signals 108 are transmitted at different power by multiple antennae to convey the received signal 110 to a specific location) and/or multiple sensors 112 may be utilized (e.g., a three-dimensional visual scanning system wherein sensors 112 are positioned in various locations and that concurrently or consecutively scan or capture images of an object in order to generate a representation from multiple perspectives, or a triangulation technique that involves detecting the received signals 110 by the sensor 112 moved to different locations and/or by multiple sensors 112 positioned in different locations). In some scenarios, the device may comprise a bidirectional transceiver that both transmits the transmitted signal 108 via the emitter 106 to be detected by a second device and that receives the received signals 110 via the sensor 112 that are transmitted by the second device. Such communication may be consecutive and/or concurrent, such as half-duplex vs. full-duplex transmission, and/or may be selectively broadcast by a first device to a second device or may comprise a multicast or broadcast signal transmission. In some scenarios, the transmitted signal 108 may be transmitted and/or the received signal 110 may be detected as a positive or negative maximum amplitude; in other scenarios, the transmitted signal 108 may be transmitted and/or the received signal 110 may be detected as low amplitude in a typically high-amplitude medium.

As a third variation of this first aspect, the techniques presented herein may be utilized with signals that take various forms in a sample series 206. For example, the received signal 110 may comprise a pulse, and the sensor 112 may detect the pulse as a sudden increase over time in the magnitude of the samples over a range of at least two samples. In some scenarios, the received signal 110 may be transmitted and/or detected as a direct increase in magnitude. In some scenarios, the received signal 110 may be transmitted and/or detected as a high-magnitude difference with respect to a preceding state or a reference point such as a baseline. Alternatively or additionally, the received signal 110 may comprise a waveform, such as a Gaussian waveform, sine waveform, sinc wave, square waveform, triangular waveform, and/or sawtooth waveform. In some scenarios, multiple waveforms may be transmitted that resemble different symbols in a symbol set, such as a first waveform representing a digital 0 and a second waveform representing a digital 1, and the detection of a signal further includes an identification of the symbol represented by the waveform of the received signal 110. In some embodiments, the waveform of a signal may include various features, such as amplitude modulation and/or frequency modulation. The received signal 110 may be transmitted and/or detected according to the waveform (e.g., determining that the samples of the sample series 206 resemble the waveform, such as oscillations that resemble at least a half-period of oscillation). In some embodiments, the detection of the waveform of the received signal 110 may take into account a modification or adjustment of the waveform due to the transmission by an emitter 106, reflection by and/or transmission through one or more surfaces 802, propagation through a medium, and/or detection by the sensor 112. As one example, a distance estimation sensor on board a moving object and/or detecting moving objects may determine that a reflected waveform may exhibit a Doppler shift due to a relative velocity difference between the emitter/sensor and the surface 802 reflecting the waveform.

As a third variation of this first aspect, the temporal position 212 of the received signal 110 within the sample series 206 may represent various properties. As a first such example, the sample series 206 may be collected over a chronological scale, such as sampling the sensor 112 at the time sample interval 214, and the temporal position 212 may correspond to the time at which received signal 110 was received relative to the time at which the transmitted signal 108 was transmitted.

As a fourth variation of this first aspect, the determination of the temporal position 212 of the received signal 110 within the sample series 206 may enable a variety of further determinations that may be usable in a variety of applications. As illustrated in the example scenario 100 of FIG. 1, a LIDAR-based imaging system may utilize a time-of-flight sensor to determine the temporal position 212 of the received signal 110 within the sample series 206 as a time-of-flight of the transmitted signal 108 over a distance, and the time-of-flight may enable a determination of distances and/or ranges, which may be usable in scenarios such as three-dimensional imaging, vehicle assistance, and autonomous control of vehicles such as cars, buses, trucks, trains, aircraft, and watercraft, including drones. Many scenarios may be identified in which the techniques presented herein may be utilized.

E2. Generating Filter Set

Figure 10A:
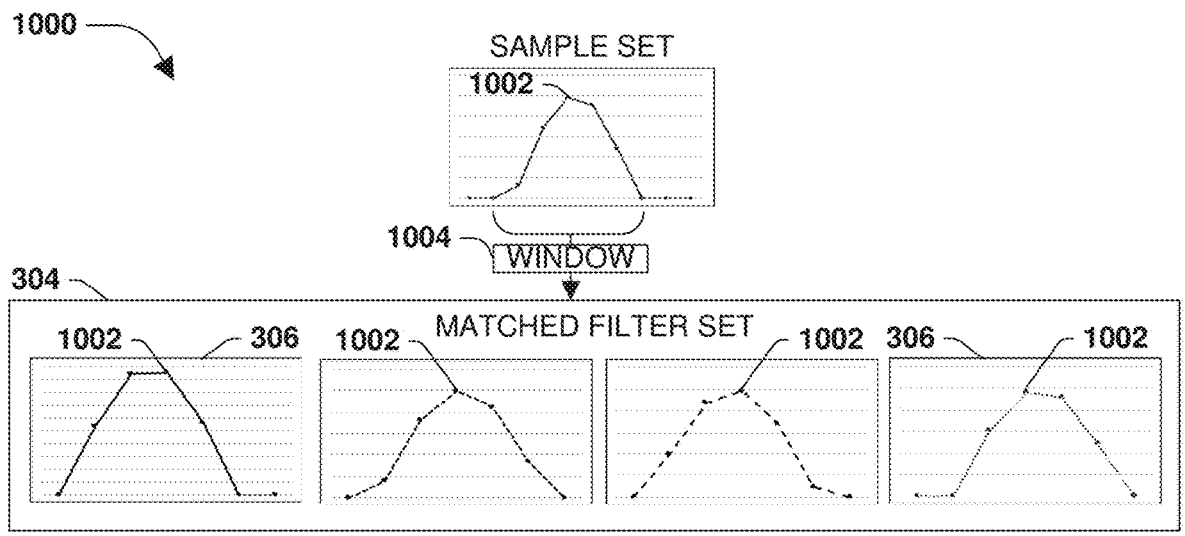
FIGS. 10A-10C are illustrations of example scenarios featuring matched filter sets that may be utilized to detect signals in sample series in accordance with the techniques presented herein.
Figure 10B:
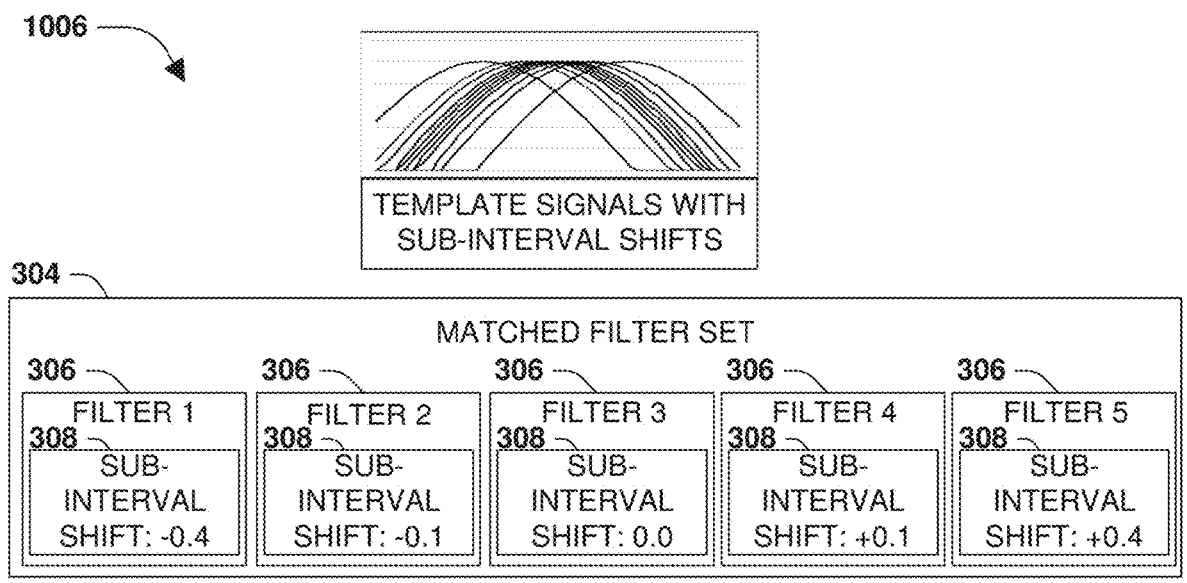
Figure 10C:
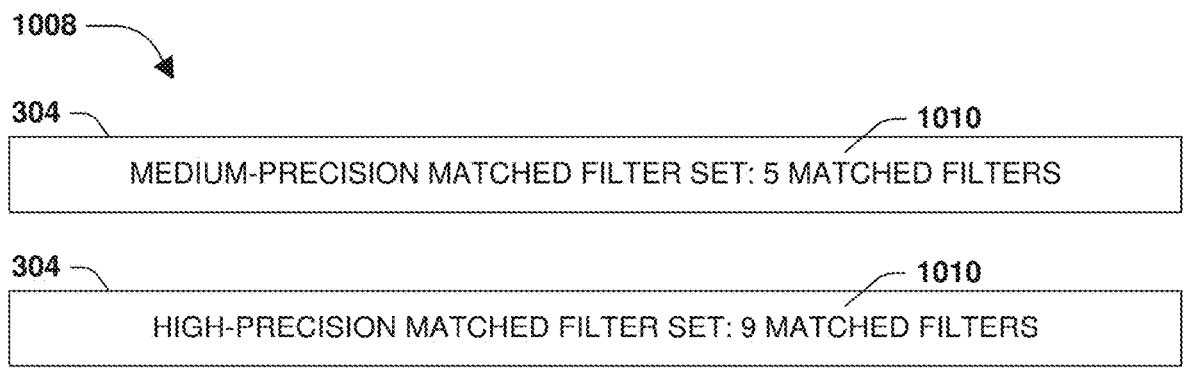

A second aspect that may vary among embodiments of the techniques presented herein involves the generation of the impulse responses of the respective matched filters 306 of the matched filter set 304 to be applied to the signal series 206 to detect the received signal 110 within the sample series 206. FIGS. 10A-10C are illustrations of some example scenarios featuring a few additional variations in the generation of matched filters 306 in accordance with this second aspect.

As a first variation of this second aspect, the impulse response of the respective matched filters 306 of the matched filter set 304 may be generated statically and in advance of receiving a request to detect the received signal 110 within the sample series 206. For example, the type of the transmitted signal 108 and/or the received signal 110 to be detected may be known in advance, and a nonvolatile memory of a device may store the different impulse responses of the respective matched filters 306 of the matched filter set 304 for use to detect the received signal 110 within the sample series 206 upon request. Alternatively, the matched filter set 304 may be generated in a static but ad-hoc manner to fulfill a request to detect the received signal 110 within the sample series 206. As another example, the matched filter set 304 may be generated dynamically; e.g., a device may endeavor to identify repeating received signals 110 within the sample series 206, and upon detecting an instance of the received signal 110 of interest, the device may add a new matched filter 306 to the matched filter set 304 to identify a repetition of received signal 110 elsewhere within the sample series 206.

As a second variation of this second aspect, a variety of mathematical techniques may be utilized to generate the respective matched filters 306 of the matched filter set 304. In many such scenarios, the respective matched filters 306 may determine the matched filter correlation using a convolution element which provides a reversed conjugate of the signal 202 to be detected, such that a convolution sum applying the matched filter 306 to the sample series 206 (or, conversely, applying the sample series 206 to the matched filter 306) may result in a detection of the received signal 110 at a selected temporal position 212 within the sample series 206 where the correspondence between the matched filter 306 and the received signal 110 within the sample series 206 is maximal. Additionally, a variety of techniques may be utilized to calculate matched filters 306 that correspond to the received signal 110 within the sample series 206 at different sub-interval shifts 308. FIG. 3 presents the first technique for calculating the respective matched filters 306 at different sub-interval shifts 308, wherein the respective matched filters 306 are generated by sampling the template signal 302 at respective sub-interval shifts 308. FIG. 4 presents the second technique for calculating the respective matched filters 306 at different sub-interval shifts 308, wherein the respective matched filters 306 comprise different subsample series of the oversampling 402 of the template signal 302.

FIG. 10A presents a first example scenario 1000 including a third variation of this second aspect in which respective matched filters 306 for the received signal 110 are applied over a window 1004 of the sample series 206, wherein the width of the window interval (e.g., number of data points) corresponds to the width (e.g., number of data points) of the respective matched filters 306. Rather than applying the matched filter set 304 at every possible start position within the sample series 206, an embodiment may identify a peak amplitude within the sample series 206 and may identify the window 1004 of seven samples for comparison with the matched filter set 304. The application of the matched filters 306 to the window 1004 may focus the application of the matched filters 306 on the position of the received signal 110 within the sample series 206, and the application of the matched filter set 304 to the window 1004 of samples may enable a further determination of the temporal position 212 according to the sub-interval position of the received signal 110 within the sample series 206.

FIG. 10B presents a second example scenario 1006 including a fourth variation of this second aspect in which the matched filters 306 exhibit a non-uniform sub-interval shift 308 with respect to adjacent matched filters 306 of the matched filter set 304. In this second example scenario 1006, the template signals 302 by which the matched filters 306 are generated are not distributed uniformly over the range of sub-interval shifts 308, but rather are concentrated near a particular sub-interval shift 308 (e.g., a nominal zero shift) and are more sparsely distributed at high sub-interval shifts 308. Accordingly, several of the respective filters 306 correspond to template signals 302 with small sub-interval shift distances relative to an adjacent matched filter 306, and a few of the respective filters 306 correspond to template signals 302 with larger sub-interval shift distances relative to an adjacent matched filter 306. The density of matched filters 306 in the vicinity of the anticipated temporal position 212 may enable a fine-grain determination of variance in the temporal position 212 of the signal in this range, which may indicate a minute change in emitted periodicity; and the small number of matched filters 306 with larger sub-interval shifts 308 may detect large variance between signal instances, e.g., which may represent an unusual but significant shift in the periodicity of the received signal 110 within the sample series 206. A non-uniform matched filter set 304 of this nature may be useful, e.g., to maintain tight synchrony between a local clock or oscillator and a remote clock or oscillator of another device or with a periodic physical phenomenon.

FIG. 10O presents a third example scenario 1008 including a fifth variation of this second aspect in which the matched filter set 304 comprises a matched filter count 1010 of matched filters 306. In some scenarios, the desired precision of the received signal 110 within the sample series 206 may change; e.g., a vehicle moving at high speed may entail a more precise measurement of ranges than a vehicle moving at low speed. A request specifying a selected resolution may be fulfilled by varying the matched filter count 1010 in the matched filter set 304; e.g., additional matched filters 306 may be activated and thereby added to the matched filter set 304 to fulfill a request for more precision, and some matched filters 306 may be removed from the matched filter set 304 to fulfill a request for less precision. In some variations, the matched filter set 304 may include a large number of matched filters 306 that may all be applied to a sample series 206 to determine the temporal position 212 of the received signal 110 within the sample series 206 with maximum precision, and a lower-precision determination may be achieved by applying only a subset of the matched filters 306 in the matched filter set 304. In some variations, a request to determine the temporal position 212 of the received signal 110 within the sample series 206 with a second selected resolution that is different than a selected resolution may be fulfilled by regenerating the matched filter set 304 with a second matched filter count 1010 that differs from an initial matched filter count 1010, where the second matched filter count 1010 may be based at least on the second selected resolution. Many techniques may be utilized to generate various types of matched filter sets 304 for use in the techniques presented herein.

E3. Applying Matched Filters to Sample Series

A third aspect that may vary among embodiments of the techniques presented herein involves the application of the matched filter set 304 to a sample series 206 to determine the occurrence and temporal position 212 (e.g., time instant at which the received signal 110 occurs in the sample series 206) of the received signal 110 within the sample series 206. FIG. 11 is an illustration of some example scenarios featuring a few additional variations in the generation of matched filters 306 in accordance with this second aspect.

As a first variation of this third aspect, the matched filter correlations 508 of respective matched filters 306 with the received signal 110 within the sample series 206 may be determined in many ways. As a first such example, the matched filter correlation 508 may reflect a correspondence of the matched filter 306 with the temporal position 212 of the received signal 110 within the sample series 206 based on an integration of a sample per sample multiplication of the signal samples and the samples representing the impulse response function. Complete correspondence results in a near 100% matched filter correlation and a complete absence of correspondence results in a near 0% matched filter correlation. As a second such example, the matched filter correlation 508 may reflect a dissimilarity of the matched filter 306 with the received signal 110 within the sample series 206, e.g., a sum or product of the magnitude differences and/or magnitude difference variance between the samples of the matched filter 306 and the corresponding samples of the sample series 206, wherein complete correspondence results in an aggregate distance of zero and a complete absence of correspondence results in a very large aggregate distance. In some variations, the matched filter correlation 508 may be determined as a standard deviation of respective samples of the sample series 206 compared with the corresponding samples of the matched filter 306. In some variations, the matched filter correlation 508 for a first matched filter 306 may be determined relative to the matched filter correlations 508 for other matched filters 306 of the matched filter set 304.

As a second variation of this third aspect, the received signal sub-interval shift 512 may be determined by identifying a selected matched filter that presents a maximum matched filter correlation among the matched filter correlation set of matched filter correlations 508. The sub-interval shift 308 of the selected matched filter may be selected as the received signal sub-interval shift 512. Accordingly, the temporal position 212 of the received signal 110 within the sample series 206 may be adjusted by a temporal position offset 310 corresponding to the sub-interval shift 308 of the selected matched filter to produce a temporal position determination 216 in accordance with the techniques presented herein.

Figure 11A:
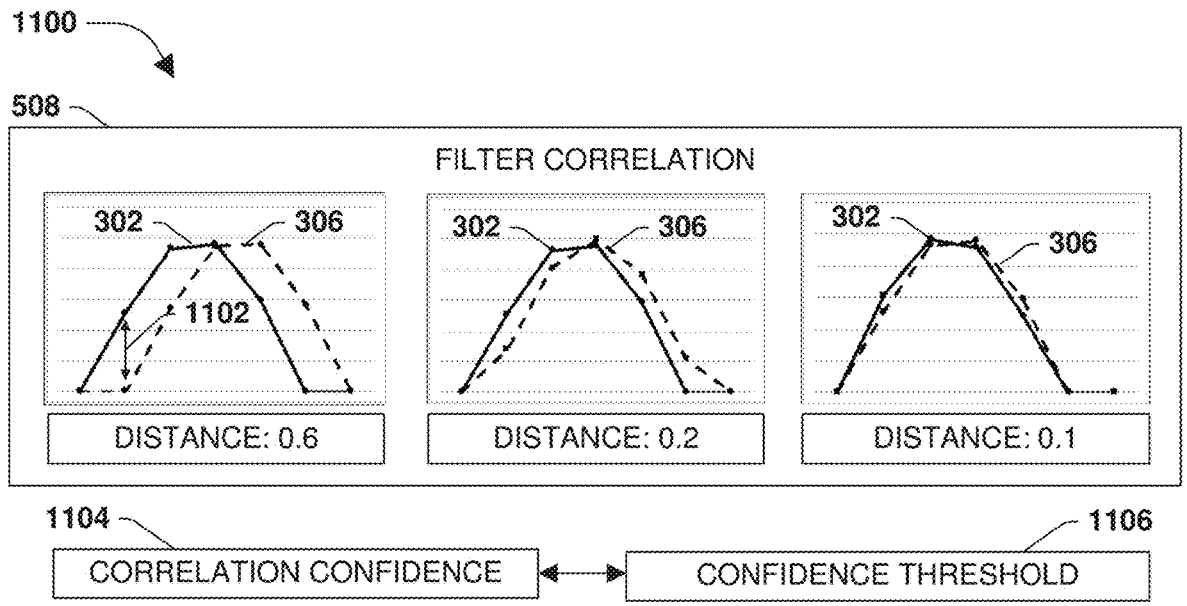
FIGS. 11A-11B are illustrations of example scenarios featuring the applications of matched filter sets to sample series in accordance with the techniques presented herein.
Figure 11B:
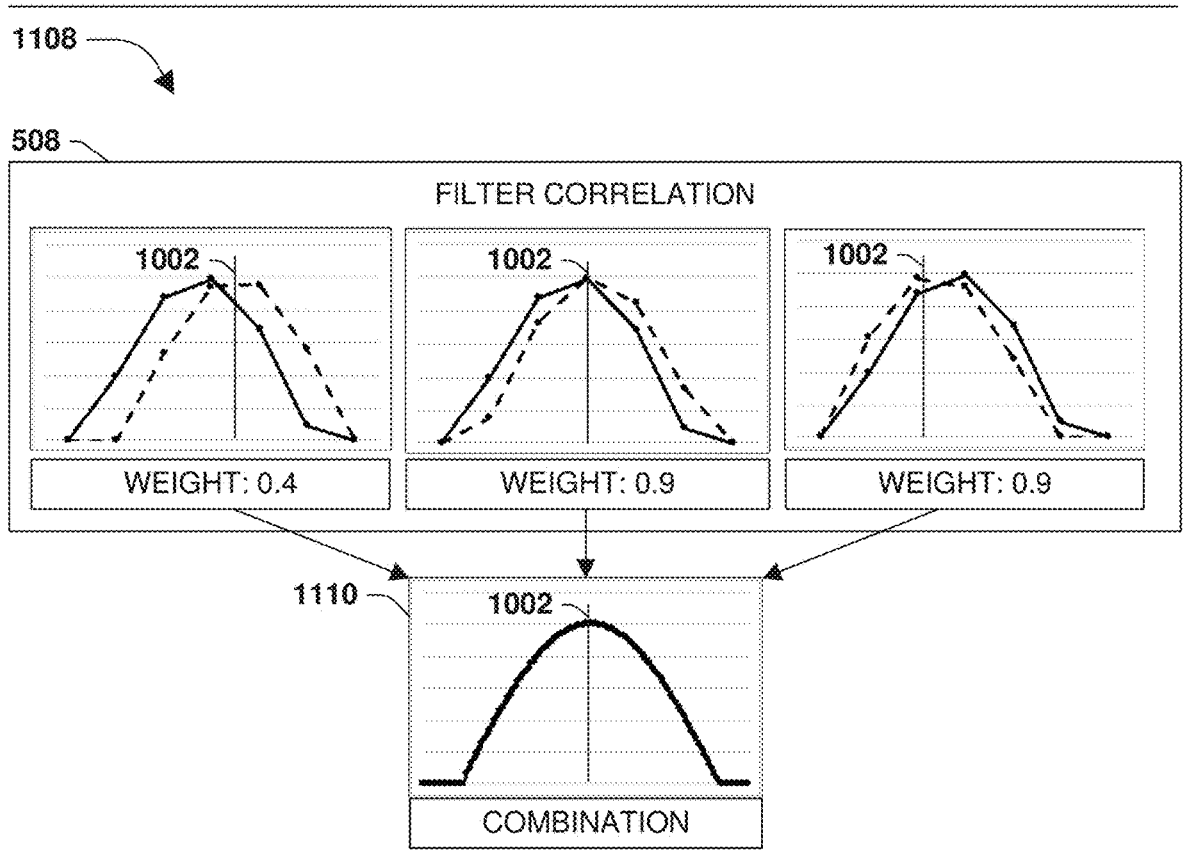

FIG. 11A presents an illustration of a first example scenario 1100 featuring a third variation of this third aspect in which distances 1102 are calculated between successive samples of respective matched filters 306 and the corresponding samples of the sample series 206. In this first example scenario 1100, an aggregate distance is determined between the samples of the sample series 206 and the corresponding samples of each matched filter 306, resulting in a determination of a correlation confidence 1104 as the inverse of the aggregate distance. The correlation confidence 1104 may be used, e.g., to determine an overall confidence in the detection of the received signal 110 within the sample series 206. Alternatively or additionally, the correlation confidence 1104 may be used, e.g., to determine a deviation between the received signal 110 and the ideal received signal 202 or the template signal 302, where a low correlation confidence 1104 indicates significant deviation and a high likelihood that the correlation is the result of noise. In some embodiments, the matched filter correlation may be compared with a correlation confidence threshold 1106, wherein a failure of any matched filter correlation 508 to satisfy the correlation confidence threshold 1106 is reported as an absence or loss of the received signal 110 within the sample series 206, which may result, e.g., from a reduced signal-to-noise ratio.

FIG. 11 presents an illustration of a second example scenario 1108 featuring a fourth variation of this third aspect in which the respective matched filters 306 contribute to a combination 1110, such as a consensus determination of the temporal position 212 of the received signal 110 within the sample series 206 as a consensus of the matched filter correlations 508 of the respective matched filters 306. In this example scenario 1108, each matched filter 306 yields the matched filter correlation 508, and the sub-interval shifts 308 of the respective matched filters 306 may contribute to the combination 1110 relative to the matched filter correlation 508 and/or filter correlation confidence 1104 of the respective matched filters 306, such as according to the matched filter correlation distance between the matched filter 306 and the corresponding samples of the sample series 206. An embodiment may therefore weight the respective time positions utilizing the matched filter correlations 508 as weight and calculate a weighted and normalized sum of matched filter correlations 508 among the set of matched filter correlation set, multiplied by the sub-interval shifts 308 of the respective matched filters 304, as the received signal sub-interval shift 512. In one such embodiment, a product is calculated for the respective matched filters 304 of the sub-interval shifts 308 of the matched filter 306 with the matched filter correlation 508 of the matched filter 306; a sum is calculated of the products of the respective matched filters 304, wherein the sum is normalized by a matched filter correlation sum of the matched filter correlations 508; and the received signal sub-interval shift 512 is determined as a product of the sum and the sample interval 214. Alternatively or additionally, the sum may be identified according to a mean or median of the matched filter correlations 508 among the matched filter set 304 of matched filters 306.

As a fifth variation of this third aspect, the matched filter set 304 may be applied over a plurality of sample series 206, and the matched filter correlations 508 of the respective matched filters 306 may be accumulated. For example, in order to detect received signals 110 within the sample series 206 that are periodic with a known periodicity but that present a comparatively poor signal-to-noise ratio, the matched filters 306 may be applied to a sequence of sample series 206 captured over the period. The poor signal-to-noise ratio may reduce the confidence of detecting the received signal 110 within the sample series 206 at any particular temporal position 212. Instead, the sampling may comprise sampling the sensor at the sampling frequency to generate at least two replicate sample series, thereby generating at least two sets of matched filter correlations 508. The sets of matched filter correlations 508 may be generated for the successive sample series 206, and the matched filter correlations 508 of the respective matched filters 306 may be accumulated. A consistently higher matched filter correlation 508 of a particular matched filter 306 within the matched filter set 304 over a multitude of sample series 206 may enable a higher-confidence determination of the temporal position 212 of the received signal 110 within the sample series 206. Many such techniques may be utilized to apply the matched filter set 304 to a sample series 206 in accordance with the techniques presented herein.

E4. Architectural Variations

Figure 12:
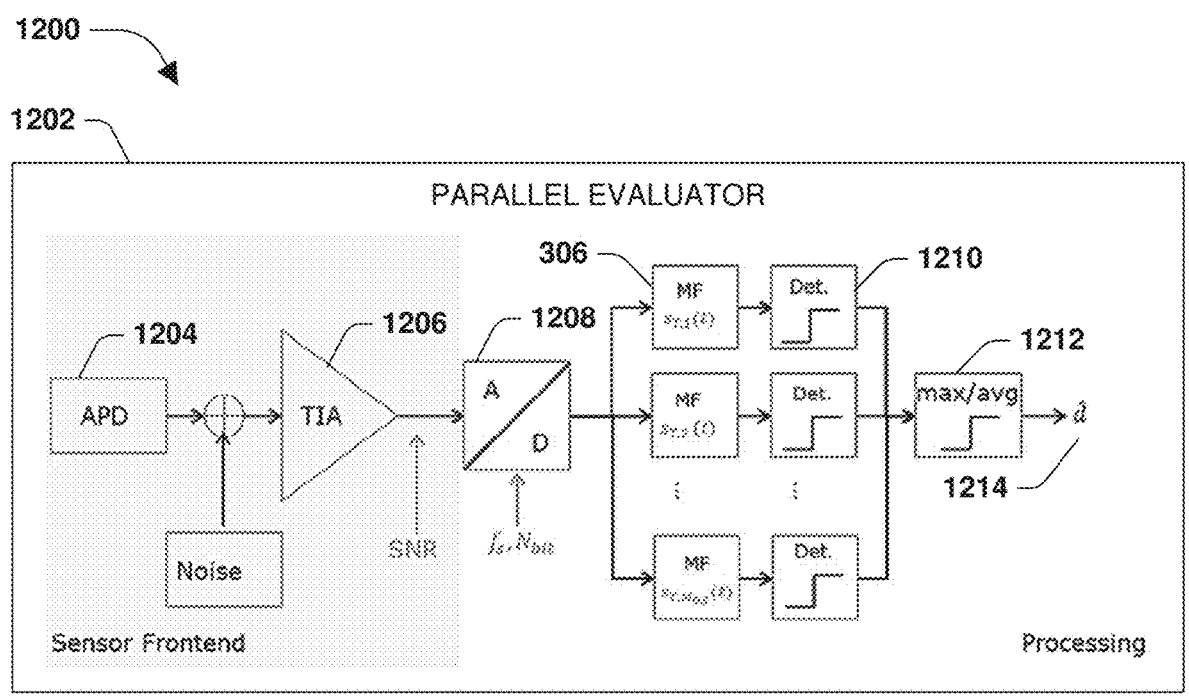
FIG. 12 is an illustration of an example architecture that may be utilized to implement the techniques presented herein.

A fourth aspect that may vary among embodiments of the techniques presented herein involves variations in the architecture of provided embodiments. FIG. 12 presents an architectural illustration of an example embodiment.

As a first variation of this fourth aspect, an embodiment may store the sample series 206 in a variety of ways. For example, a device may comprise a shift register with a sample length (e.g., of sufficient length to hold enough samples to represent an instance of the received signal 110 within the sample series 206 when sampled at the sampling frequency 504 of the sensor 112). New samples may be inserted into the shift register while old samples may be rotated out of the shift register. Alternatively, an embodiment may utilize a memory buffer to store the samples of the sample series 206.

FIG. 12 presents an example 1200 of an example embodiment of the presented techniques in the form of a parallel evaluator 1202. In this parallel evaluator 1202, the output of the sensor 112, such as an avalanche photodiode 1204 ("APD"), is provided to a transimpedance amplifier 1206. The amplified continuous-time signal is sampled by an analog to digital converter 1208 ("A/D") at the sampling frequency 504 to produce the sample series 206. The sample series 206 is then provided, in parallel, to a matched filter set 304 of matched filters 306, comprising an evaluator set of evaluators that respectively apply a single matched filter 306 to the sample series 206. The parallel evaluators concurrently evaluate the sample series 206 to generate a matched filter correlation set of matched filter correlations 508, and the determination 1210 of the respective evaluators is calculated as a max and/or average 1212 that identifies the received signal sub-interval shift 1214. This architecture may be advantageous, e.g., for applying a potentially large number of evaluators with different sub-interval shifts 308 to the sample series 206 to expedite the determination of the received signal 110 within the sample series 206 and the temporal position 212 thereof. Many such architectures may be devised and utilized in accordance with the techniques presented herein.

F. Simulation Results

Prototype implementations of some variations of the currently presented techniques have been subjected to simulations that compare the results with other techniques, such as a sampling of the sensor 112 at the sampling frequency 504 without adjustment based on at least the sub-interval shift 308 and the sampling of the received signal 110 within the sample series 206 at the oversampling frequency 504 of the sensor 112 without adjustment based on at least the sub-interval shift 308. The results of such simulations are presented in FIG. 13A, FIG. 13B, and FIG. 14.

Figure 13A:
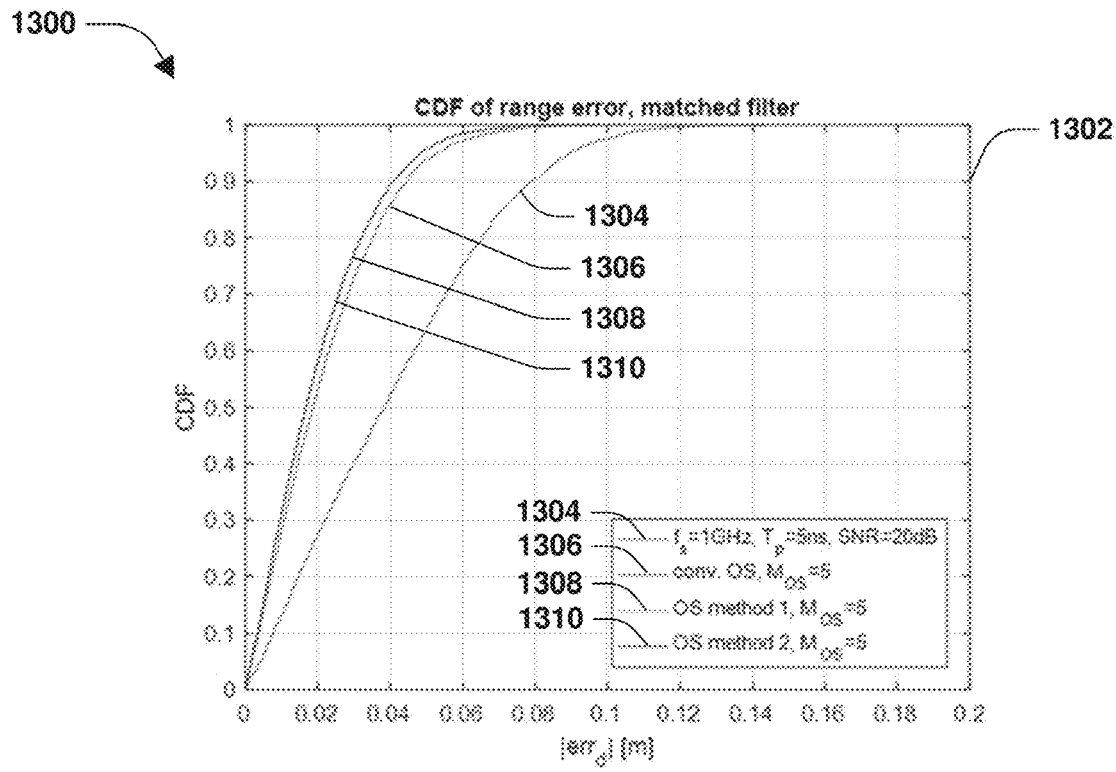
FIGS. 13A-13B are illustrations of a first data set providing results of a simulated application of the techniques presented herein.
Figure 13B:
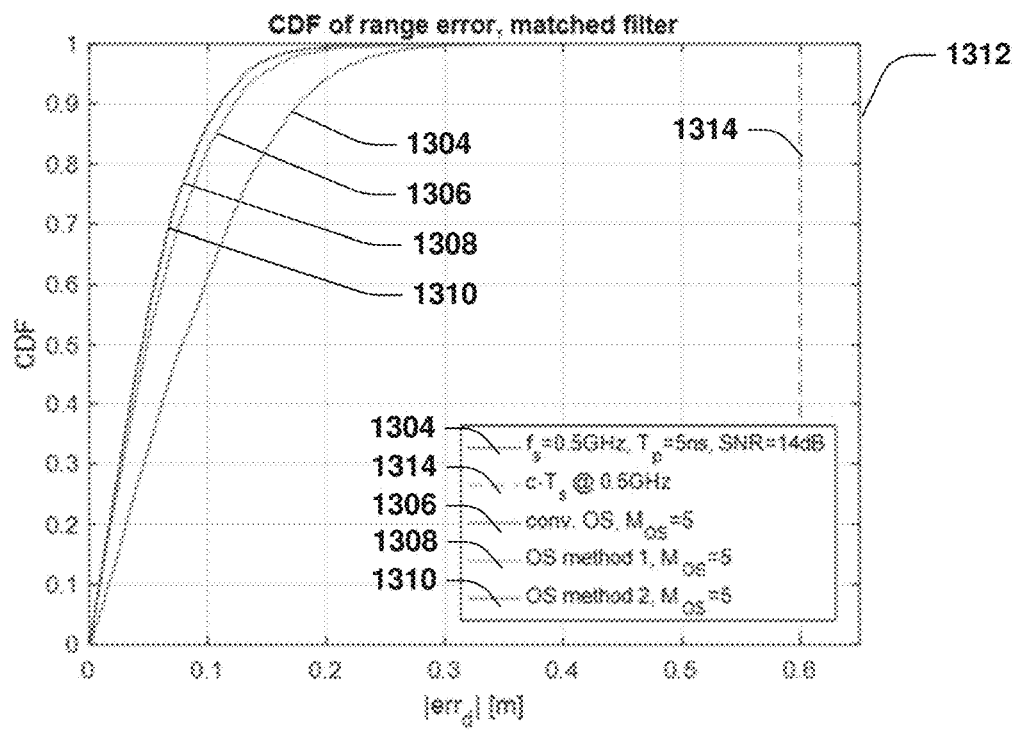

In FIG. 13A, simulation of the prototypes was performed at a one-gigahertz sampling rate 1302. In FIG. 13B, simulation of the prototypes was performed at a 500-megahertz sampling rate 1312. Both simulations used Gaussian pulse shapes and Monte Carlo simulations over 5,000 trials at selected signal-to-noise ratios (a 20 dB signal-to-noise ratio in the first simulation and a 14 dB signal-to-noise ratio in the second simulation). In both simulations, the range error of the respective sampling techniques was determined as a cumulative distribution function, wherein more proficient correlational techniques exhibit a steeper convergence of the range error. In both simulations, a first one of the samplings 1304 at the sampling frequency 504 without adjustment based on a sub-interval shift 308 exhibits a poor range error. A second one of the samplings 1306 at a five-fold greater sampling frequency 504 but still without adjustment based on a sub-interval shift 308 exhibits a reduced range error. However, a third one of the samplings 1304 at the sampling frequency 504 using a matched filter set 304 of five matched filters corresponding to five sub-interval shifts 308 in accordance with the example scenario 300 of FIG. 3 and a fourth one of the samplings 1304 at the sampling frequency 504 using a matched filter set 304 of five matched filters corresponding to a subset selection of a set sampled 1306 at a five-fold greater sampling frequency 504 in accordance with the example scenario 400 of FIG. 4) exhibit a further reduced range error than the first sampling 1304, and even lower than the second sampling 1306 involving the higher sampling frequency. It is to be noted that the curves 1308 and 1310 yield the same cumulative distribution function and are therefore not distinguishable in FIG. 13A and FIG. 13B.

Figure 14:
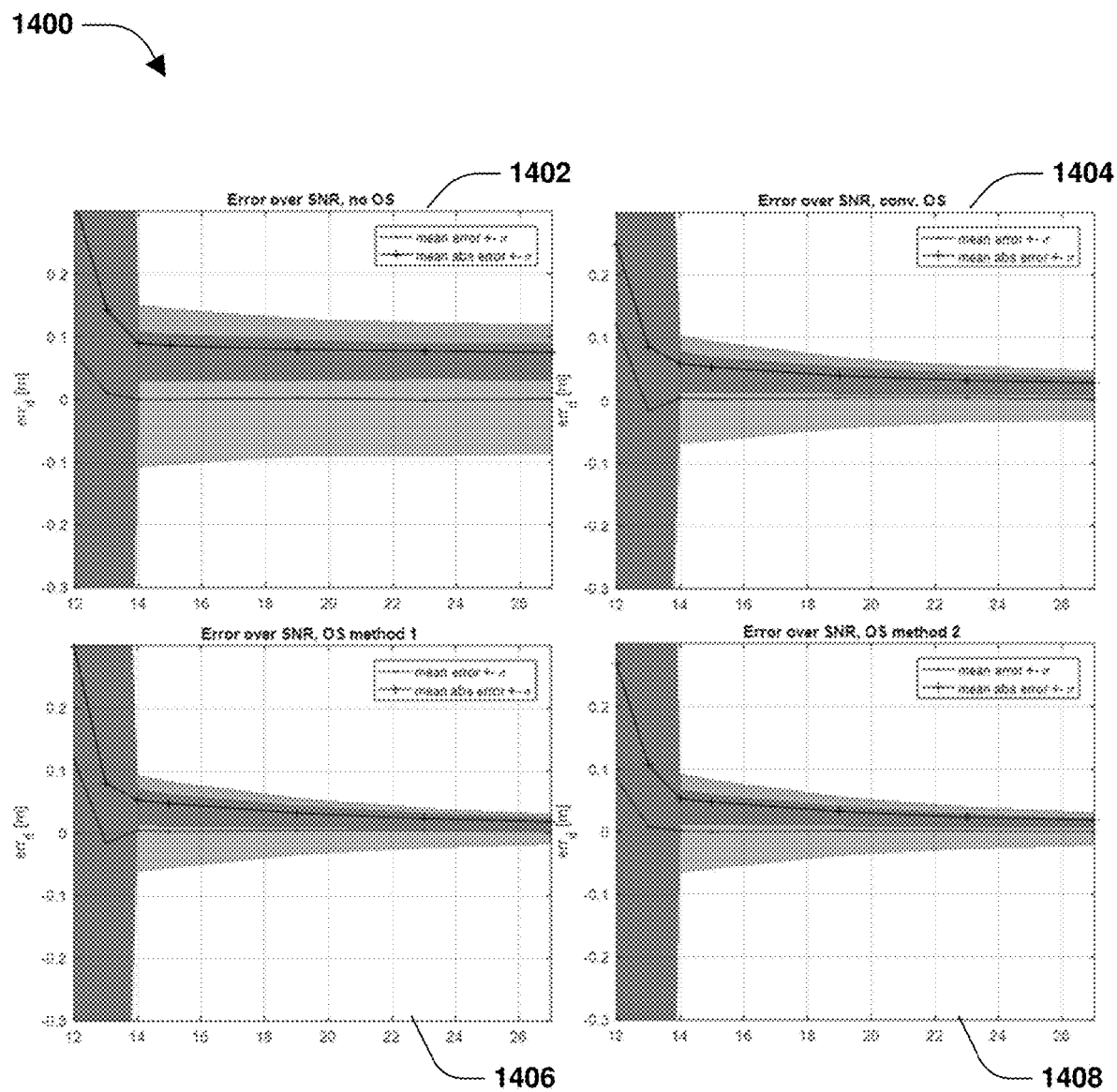
FIG. 14 is an illustration of a second data set providing results of a simulated application of the techniques presented herein.

Similarly, FIG. 14 presents simulation plots of the mean distance errors of various sampling techniques over a range of signal-to-noise ratios (as represented by the horizontal axis). The mean distance error for a first one of the samplings 1402 at the sampling frequency 504 without adjustment based on a sub-interval shift 308 exhibits a standard deviation of the distance error over a wide range of signal-to-noise ratios, even at a comparatively high signal-to-noise ratio. A second one of the samplings 1404 at a five-fold greater sampling frequency 504 but still without adjustment based on a sub-interval shift 308 exhibits a decrease of the standard deviation of the distance error as the signal-to-noise ratio increases. However, a third one of the samplings 1406 at the sampling frequency 504 using a matched filter set 304 in accordance with the example scenario 300 of FIG. 3 and a fourth one of the samplings 1408 at the sampling frequency 504 using a matched filter set 304 in accordance with the example scenario 400 of FIG. 4 exhibit a more rapid decrease of the standard deviation of the distance error over the signal-to-noise ratio, outperforming both the first one of the samplings 1402 and the second one of the samplings 1404 at the increased sampling frequency 504. Indeed, the reduction in standard deviation of the distance error for both techniques presented herein, as compared with the other techniques, increases as the signal-to-noise ratio increases. These simulation results therefore demonstrate the increase in precision in the determination of the temporal position of the received signal 110 within the sample series 206 in accordance with the techniques presented herein.

G. Computing Environment

Figure 15:
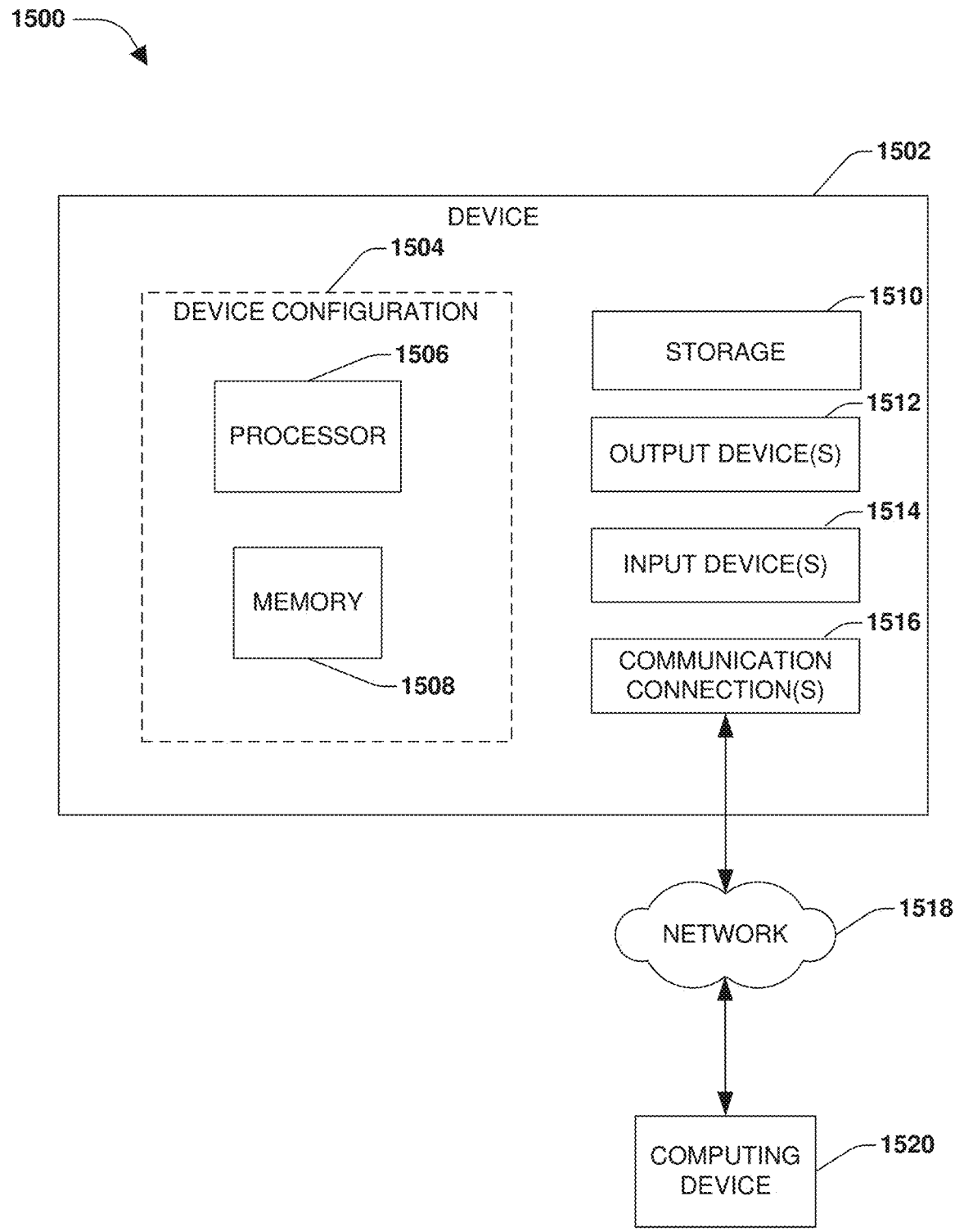
FIG. 15 is an illustration of an example computing environment wherein at least a portion of the currently presented techniques may be utilized.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, without limitation, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example 1500 of a system comprising a computing device 1502 configured to implement one or more embodiments provided herein. In one configuration, computing device 1502 includes at least one processing unit 1506 and memory 1508. Depending on the exact configuration and type of computing device, memory 1508 may be volatile (such as RAM, for example), non-volatile (such as ROM, flash memory, etc., for example), or some combination of the two. This configuration is illustrated in FIG. 15 by dashed line 1504.

In some embodiments, device 1502 may include additional features and/or functionality. For example, device 1502 may also include additional storage (e.g., removable and/or non-removable) including, without limitation, magnetic storage, optical storage, and the like. Such additional storage is illustrated in FIG. 15 by storage 1510. In one embodiment, computer readable instructions to implement one or more embodiments provided herein may be in storage 1510. Storage 1510 may also store computer readable instructions to implement an operating system, an application program, and the like. Computer readable instructions may be loaded in memory 1508 for execution by processing unit 1506, for example.

The term "computer readable media" as used herein includes computer storage media. Computer storage media includes volatile and nonvolatile, removable and non-removable media implemented in any method or technology for storage of information such as computer readable instructions or other data. Memory 1508 and storage 1510 are examples of computer storage media. Computer storage media includes, without limitation, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1502. Any such computer storage media may be part of device 1502.

Device 1502 may also include communication connection(s) 1516 that allows device 1502 to communicate with other devices. Communication connection(s) 1516 may include, without limitation, a modem, a Network Interface Card (NIC), an integrated network interface, a radio frequency transmitter/receiver, an infrared port, a USB connection, or other interfaces for connecting computing device 1502 to other computing devices. Communication connection(s) 1516 may include a wired connection or a wireless connection. Communication connection(s) 1516 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1502 may include input device(s) 1514 such as keyboard, mouse, pen, voice input device, touch input device, infrared cameras, video input devices, and/or any other input device. Output device(s) 1512 such as one or more displays, speakers, printers, and/or any other output device may also be included in device 1502. Input device(s) 1514 and output device(s) 1512 may be connected to device 1502 via a wired connection, wireless connection, or any combination thereof. In one embodiment, an input device or an output device from another computing device may be used as input device(s) 1514 or output device(s) 1512 for computing device 1502.

Components of computing device 1502 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In an embodiment, components of computing device 1502 may be interconnected by a network. For example, memory 1508 may be comprised of multiple physical memory units located in different physical locations interconnected by a network.

Those skilled in the art will realize that storage devices utilized to store computer readable instructions may be distributed across a network. For example, a computing device 1520 accessible via network 1518 may store computer readable instructions to implement one or more embodiments provided herein. Computing device 1502 may access computing device 1520 and download a part or all of the computer readable instructions for execution. Alternatively, computing device 1502 may download pieces of the computer readable instructions, as needed, or some instructions may be executed at computing device 1502 and some at computing device 1520.

H. Claim Summary

An embodiment of the presently disclosed techniques comprises a method of determining a temporal position of a received signal within a sample series. The method comprises: sampling a sensor at a sampling frequency to generate the sample series; applying a matched filter set of matched filters to the sample series to generate a matched filter correlation set of matched filter correlations, wherein impulse responses of respective matched filters correspond to a template signal at the sampling frequency of the sensor shifted by a sub-interval shift; evaluating the matched filter correlations to determine a received signal sub-interval shift; and determining the temporal position of the signal within the sample series based on at least the received signal sub-interval shift.

An embodiment of the presently disclosed techniques comprises an apparatus for determining a temporal position of a received signal within a sample series. The apparatus comprises: means for sampling a sensor at a sampling frequency to generate the sample series; means for applying a matched filter set of matched filters to the sample series to generate a matched filter correlation set of matched filter correlations, wherein impulse responses of respective matched filters correspond to a template signal at the sampling frequency of the sensor shifted by a sub-interval shift; means for evaluating the matched filter correlations to determine a received signal sub-interval shift; and means for determining the temporal position of the signal within the sample series based on at least the received signal sub-interval shift.

An embodiment of the presently disclosed techniques comprises a sensor comprising a signal detector to apply a matched filter set of matched filters to a sample series of the sensor at a sampling frequency, wherein respective matched filters correspond to a template signal at the sampling frequency shifted by a sub-interval shift, to identify a received signal sub-interval shift of a received signal within the sample series; and a temporal position determiner to determine a temporal position of the received signal within the sample series based on at least the received signal sub-interval shift of the received signal within the sample series.

An embodiment of the presently disclosed techniques comprises a time-of-flight device comprising an emitter to emit a transmitted signal; a receiver to receive a reflection of the transmitted signal by sampling a sensor at a sampling frequency to generate a sample series comprising a received signal; a signal detector to apply a matched filter set of matched filters to the sample series, wherein impulse responses of respective matched filters correspond to a template signal sampled at the sampling frequency and shifted by a sub-interval shift, to identify a received signal sub-interval shift of the received signal within the sample series; and a time-of-flight determiner that determines a time-of-flight of the transmitted signal based on at least the received signal sub-interval shift of the received signal within the sample series.

I. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    applying a matched filter set of matched filters to a sample series to generate a matched filter correlation set of matched filter correlations;

evaluating the matched filter correlations to determine a received signal sub-interval shift; and determining a temporal position of a received signal within the sample series based on at least the received signal sub-interval shift.

2. The method of claim 1, further comprising:

generating respective matched filters by sampling a template signal with a sampling frequency and using a set of different sub-interval shifts for the respective matched filters.

3. The method of claim 2, wherein generating the respective matched filters further comprises:

generating the respective matched filters according to an equation comprising:

$$s_{T,i}[n] = s_T\left(nT_s + \left(\frac{M_{OS}-1}{2} - (i-1)\right)\frac{T_s}{M_{OS}}\right),$$
$$i = 1, \ldots, M_{OS}, n = 1, \ldots, N_S,$$

wherein:

$N_s$ comprises a count of matched filters of the matched filter set;

n comprises an index of a matched filter within the matched filter set;

i comprises a sample index for n;

$s_T(\ldots)$ comprises the template signal at a selected time;

$T_S$ comprises a duration of a sample interval of the template signal;

$M_{OS}$ comprises an oversampling ratio relative to the sampling frequency of a sensor; and $s_{T,i}[n]$ comprises a value of a matched filter at i.

4. The method of claim 1, further comprising:

generating respective matched filters using a subsample series of samples of an oversampled template of the received signal.

5. The method of claim 4, wherein generating the respective matched filters further comprises:

generating the respective matched filters using an oversampled template of the received signal according to an equation comprising:

$$s_{T,i}[n] = s_T\left(n\frac{T_s}{M_{OS}}\right), n = i, M_{OS} + i, \ldots, (N_s - 1)M_{OS} + i$$

wherein:

$N_s$ comprises a count of matched filters of the matched filter set;

n comprises an index of a matched filter within the matched filter set;

i comprises a sample index for n;

$s_T(\ldots)$ comprises a template signal at a selected time;

$T_S$ comprises a duration of a sample interval of the template signal;

$M_{OS}$ comprises an oversampling ratio relative to a sampling frequency of a sensor; and $s_{T,i}[n]$ comprises a value of a matched filter at i.

6. The method of claim 1, wherein applying the matched filter set to the sample series further comprises:

selecting a window of samples within the sample series; and applying the matched filter set to the window of samples.

7. The method of claim 1, wherein the matched filter set further comprises:

a first matched filter that differs from a first adjacent matched filter by a first sub-interval shift distance; and a second matched filter that differs from a second adjacent matched filter by a second sub-interval shift distance that is different than the first sub-interval shift distance.

8. The method of claim 1, further comprising:

generating respective matched filters with a matched filter count based at least on a selected resolution of the temporal position of the received signal.

9. The method of claim 8, further comprising:

receiving a request to determine the temporal position of the received signal with a second selected resolution that is different than the selected resolution; and responsive to the request, regenerating the respective matched filters with a second matched filter count based at least on the second selected resolution.

10. The method of claim 1, wherein determining the received signal sub-interval shift further comprises:

identifying a selected matched filter that presents a maximum matched filter correlation among the matched filter correlations of the matched filter set; and selecting a sub-interval shift of the selected matched filter as the received signal sub-interval shift.

11. The method of claim 1, wherein determining the received signal sub-interval shift further comprises:

for each respective matched filter, calculating a product of a sub-interval shift of the respective matched filter with a matched filter correlation of the matched filter; and calculating a sum of the products of respective matched filters, wherein the sum is normalized by a matched filter correlation sum of the matched filter correlations.

12. The method of claim 1, wherein:

applying the matched filter set to the sample series further comprises:

applying the matched filter set to at least two replicate sample series to generate at least two sets of matched filter correlations; and determining the received signal sub-interval shift further comprises:

accumulating the at least two sets of matched filter correlations for the at least two replicate sample series; and evaluating the at least two sets of matched filter correlations accumulated over the at least two replicate sample series to determine the received signal sub-interval shift of the received signal within the sample series.

13. The method of claim 1, further comprising:

determining a signal confidence based at least on a correlation distance between the selected matched filter and the sample series.

14. The method of claim 13, wherein determining the signal confidence further comprises:

determining the correlation distance as a standard deviation of samples of the sample series and corresponding samples of the matched filter.

15. The method of claim 13, further comprising:

comparing the signal confidence to a signal confidence threshold; and responsive to the signal confidence failing to satisfy the signal confidence threshold, reporting an absence of the signal.

16. The method of claim 1, comprising:

identifying a median sub-interval offset based on at least a median of respective time shifts corresponding to the respective maximum matched filter correlations among the matched filter set.

17. A sensor comprising:

a signal detector to apply a matched filter set of matched filters to a sample series of the sensor to identify a received signal sub-interval shift of a received signal within the sample series; and a temporal position determiner to determine a temporal position of the received signal within the sample series based on at least the received signal sub-interval shift of the received signal within the sample series.

18. The sensor of claim 17, wherein:

the sample series is stored in a shift register with a sample length;

respective matched filters comprise a filter length of the sample length; and the signal detector applies the matched filter set to the shift register.

19. The sensor of claim 17, wherein:

the matched filter set further comprises an evaluator set of evaluators that respectively evaluate the sample series to a matched filter to generate a matched filter correlation; and the signal detector applies the matched filter set to the sample series by concurrently applying the evaluators to the sample series.

20. A time-of-flight device comprising:

a signal detector to apply a matched filter set of matched filters to a sample series to identify a received signal sub-interval shift of a received signal within the sample series; and a time-of-flight determiner that determines a time-of-flight of a transmitted signal based on at least the received signal sub-interval shift of the received signal within the sample series.

\* \* \* \* \*